(12) United States Patent
Ono et al.

(10) Patent No.: US 8,604,693 B2
(45) Date of Patent: Dec. 10, 2013

(54) PLASMA DISPLAY DEVICE CONTAINING COVER GLASS AND SUBSTRATES HAVING SIMILAR THERMAL EXPANSION COEFFICIENTS

(71) Applicant: Asahi Glass Company, Limited, Chiyoda-ku (JP)

(72) Inventors: Kazutaka Ono, Chiyoda-ku (JP); Shusaku Akiba, Chiyoda-ku (JP); Yuichi Kuroki, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/708,354

(22) Filed: Dec. 7, 2012

(65) Prior Publication Data

US 2013/0093312 A1    Apr. 18, 2013

Related U.S. Application Data

(63) Continuation of application No. PCT/JP2011/066254, filed on Jul. 15, 2011.

(30) Foreign Application Priority Data

Jul. 15, 2010   (JP) ................................ 2010-160957

(51) Int. Cl.
  *H01J 11/34*   (2012.01)
(52) U.S. Cl.
  USPC ......................................... 313/598; 313/582
(58) Field of Classification Search
  None
  See application file for complete search history.

(56) References Cited

U.S. PATENT DOCUMENTS

| | | | |
|---|---|---|---|
| 5,858,897 A | 1/1999 | Maeda et al. | |
| 6,452,331 B1 | 9/2002 | Sakurada et al. | |
| 6,638,626 B2 | 10/2003 | Sakurada et al. | |
| 7,087,308 B2 | 8/2006 | Sakurada et al. | |
| 7,264,881 B2 | 9/2007 | Sakurada et al. | |
| 8,048,531 B2 | 11/2011 | Sakurada et al. | |
| 2008/0218080 A1* | 9/2008 | Song et al. ................... | 313/582 |
| 2008/0286548 A1 | 11/2008 | Ellison et al. | |
| 2009/0079671 A1 | 3/2009 | Nishi et al. | |
| 2009/0298669 A1 | 12/2009 | Akiba et al. | |
| 2010/0011814 A1 | 1/2010 | Zou et al. | |
| 2012/0156464 A1 | 6/2012 | Ono | |

FOREIGN PATENT DOCUMENTS

| | | |
|---|---|---|
| JP | 2000-208073 | 7/2000 |
| JP | 2005-255521 | 9/2005 |

(Continued)

OTHER PUBLICATIONS

Machine translation of applicant cited JP 2000-208073 A, Jul. 28, 2000.*

(Continued)

*Primary Examiner* — Britt D Hanley
(74) *Attorney, Agent, or Firm* — Oblon, Spivak, McClelland, Maier & Neustadt, L.L.P.

(57) ABSTRACT

To provide a plasma display device whereby it is possible to improve the image quality and at the same time to reduce warpage of a thin cover glass plate having a large area. A plasma display device 10 is provided which comprises a plasma display panel 20 provided with glass substrates 21, 22, and a cover glass plate 30 bonded to the display side of the plasma display panel 20, wherein the cover glass plate 30 has a diagonal length of at least 81 cm and a thickness of at most 1.5 mm, and the average thermal expansion coefficient of the cover glass plate 30 is from 80 to 120% of the average thermal expansion coefficient of the glass substrates 21, 22 within a range of from 50 to 350° C.

6 Claims, 2 Drawing Sheets

(56) References Cited

FOREIGN PATENT DOCUMENTS

| | | |
|---|---|---|
| JP | 2007-11210 | 1/2007 |
| JP | 2009-151331 | 7/2009 |
| WO | WO 2008/084779 A1 | 7/2008 |
| WO | WO 2012/067164 A1 | 5/2012 |

OTHER PUBLICATIONS

U.S. Appl. No. 13/896,747, filed May 17, 2013, Sasaki, et al.

* cited by examiner

PLASMA DISPLAY DEVICE CONTAINING COVER GLASS AND SUBSTRATES HAVING SIMILAR THERMAL EXPANSION COEFFICIENTS

This application is a continuation of PCT Application No. PCT/JP2011/066254, filed on Jul. 15, 2011, which is based upon and claims the benefit of priority from Japanese Patent Application No. 2010-160957 filed on Jul. 15, 2010. The contents of those applications are incorporated herein by reference in its entirety.

BACKGROUND OF THE INVENTION

1. Field of the Invention

The present invention relates to a plasma display device.

2. Discussion of Background

A thin display device such as a liquid crystal display (LCD) device is mounted on mobile devices such as cell-phones, personal digital assistants (PDA), notebook computers, etc. In such a display device, a cover glass plate so-called a front plate or a front filter is disposed on the front side of a display panel, so that a user will watch a display of the display panel through the cover glass plate (e.g. Patent Document 1).

The cover glass plate is disposed mainly for the purpose of improving the aesthetic impression or strength of the display device, or prevention of impact failures. The cover glass plate is, in many cases, a chemically tempered glass plate having a compression stress layer formed at least at a part of the surface layer in order to improve the scratch resistance. As a method for producing a chemically tempered glass, an ion exchange method may, for example, be mentioned.

In the ion exchange method, glass is immersed in a treating liquid to form a compression stress layer at the surface layer of glass by replacing ions having a small ion radius (such as Na ions) contained in the surface layer of glass with ions having a large ion radius (such as K ions).

PRIOR ART DOCUMENT

Patent Document

Patent Document 1: JP-A-2007-11210

SUMMARY OF THE INVENTION

On the other hand, in recent years, the trend for large screens has been in progress for liquid crystal display (LCD) devices, plasma display devices, etc. for stationary instruments such as household-use televisions, and the screen size has become very large as compared with mobile devices.

A cover glass plate to be mounted on a display device having such a large screen (e.g. the diagonal length being at least 81 cm (32 inches)) is likely to have a large area in many cases, as compared with one to be mounted on a mobile device. Further, in order to suppress a weight increase due to such a large area, it is desired to reduce the thickness of the plate.

Whereas, in order to improve the image quality of a display device, it is conceivable to bond the cover glass plate on the display side of a display panel. It is thereby possible to eliminate an air gap which used to be present between the display panel and the cover glass plate thereby to prevent reflection of light at the interface between the air gap and the display panel and at the interface between the air gap and the cover glass plate.

However, if a cover glass plate is bonded on the display side of a display panel, warpage or the like is likely to occur due to a difference in thermal expansion between the cover glass plate and the glass substrates constituting the display panel.

Especially, as is different from a LCD device, a plasma display device has a self-luminous display panel and tends to have a high temperature during the display operation. Therefore, warpage or the like is likely to occur due to the above-mentioned difference in thermal expansion, and the aesthetic impression or display quality of the plasma display is likely to be impaired. Such an influence tends to be remarkable as the area (diagonal length) of the cover glass plate becomes large.

However, the display device disclosed in the above Patent Document 1 is designed to be mounted on a mobile device and is small-sized, and it does not have a construction capable of sufficiently reducing warpage in a case where the diagonal length of a cover glass plate is at least 81 cm (32 inches).

The present invention has been made in view of the above problem, and it is an object of the present invention to provide a plasma display device whereby it is possible to improve the image quality and at the same time to reduce warpage of a thin cover glass plate having a large area.

Solution to Problem

In order to solve the above problem, the present invention provides a plasma display device comprising a plasma display panel provided with glass substrates, and a cover glass plate bonded to the display side of the plasma display panel, wherein the cover glass plate has a diagonal length of at least 81 cm and a thickness of at most 1.5 mm, and the average thermal expansion coefficient of the cover glass plate is from 80 to 120% of the average thermal expansion coefficient of the glass substrates within a range of from 50 to 350° C.

Unless otherwise specified, "to" showing the above numerical value ranges, is used to include the numerical values disclosed before and after thereof as the lower limit value and the upper limit value, respectively, and hereinafter in this specification, "to" will be used in the same sense.

Effects of the Invention

According to the present invention, it is possible to provide a plasma display device, whereby it is possible to improve the image quality and at the same time to reduce warpage of a thin cover glass plate having a large area.

DETAILED DESCRIPTION OF THE PREFERRED EMBODIMENTS

Now, embodiments of the present invention will be described with reference to the drawings. However, it should be understood that the present invention is by no means limited to the following embodiments, and various modifications and substitutions may be made to the following embodiments without departing from the scope of the present invention.

Figure 1:
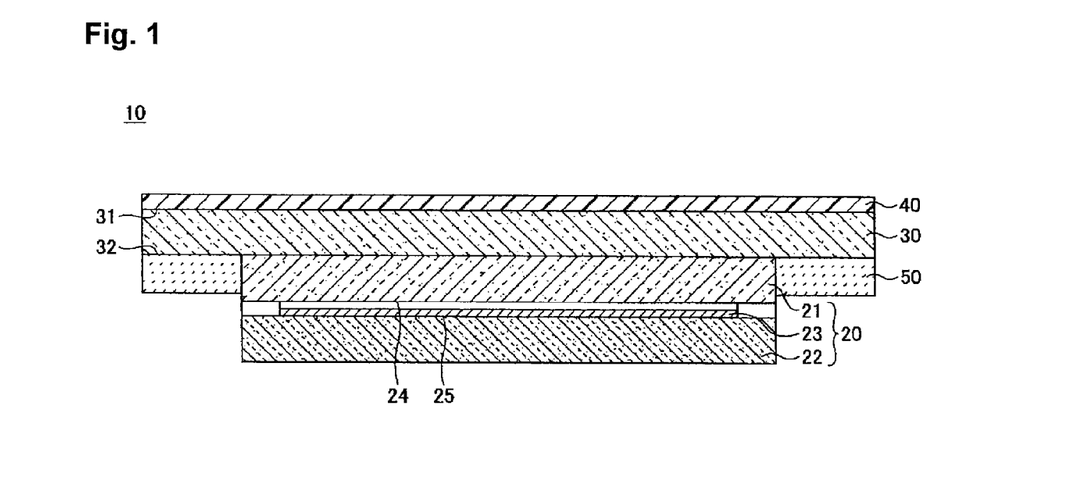
FIG. 1 is a lateral cross-sectional view of a plasma display device in one embodiment of the present invention.

FIG. 1 is a schematic lateral view of a plasma display device in one embodiment of the present invention. As shown in FIG. 1, a plasma display device 10 comprises a plasma display panel 20 and a cover glass plate 30. The cover glass plate 30 has a larger area than the plasma display panel 20, and a user watches a display of the plasma display panel 20 through the cover glass plate 30.

(Plasma Display Panel)

The plasma display panel 20 may have a common structure, and for example, as shown in FIG. 1, it is constituted by two glass substrates 21 and 22, and a fluorescent layer 23 formed between the two glass substrates 21 and 22. The thermal expansion coefficient of the plasma display panel 20 is determined mainly by the thermal expansion coefficient of the glass substrates 21 and 22.

On inner surfaces 24 and 25 of the two glass substrates 21 and 22, transparent electrode films, etc. are preliminarily formed in predetermined patterns. A rare gas (such as neon or helium) or the like is sealed between the two glass substrates 21 and 22.

This plasma display panel 20 is designed to display an image in such a manner that when a voltage is applied to the rare gas across the transparent electrode films, ultraviolet rays are generated to let the phosphor layer 23 produce fluorescence.

The glass substrates 21 and 22 are subjected to heat treatment in the process for producing the plasma display panel 20, and therefore, they are formed of glass having a high strain point temperature (e.g. glass having a strain point of about 570° C.). It is thereby possible to prevent pattern distortion due to heat shrinkage (structural relaxation).

Further, the glass substrates 21 and 22 are, in many cases, formed of glass having a large thermal expansion coefficient (typically glass having an average thermal expansion coefficient in a range of from 50 to 350° C. (hereinafter referred to simply as "an average thermal expansion coefficient") being about $83 \times 10^{-7}/°$ C.) in order to minimize the difference in thermal expansion from glass frits to be used for sealing the peripheral portion. Further, the two glass substrates 21 and 22 may have different compositions, but in order to reduce the production cost or to reduce warpage to be caused by a difference in thermal expansion, they preferably have the same composition.

In a process for producing glass substrates 21 and 22, firstly, a plurality of glass raw materials are mixed to obtain a desired blend, which is continuously introduced into a melting furnace and heated and melted at from 1,500 to 1,600° C. Then, the molten glass is formed into a plate having a predetermined thickness, which is annealed and then cut to obtain glass substrates 21 and 22.

Here, the method for forming the molten glass into a plate having a predetermined thickness may, for example, be a float process or a fusion process, although the method is not particularly limited. In the float process, the molten glass is continuously supplied to the surface of a molten metal (e.g. molten tin) in a bath to form it into a band plate shape. In the fusion process, the molten glass is continuously supplied into a trough having a substantially V-shape in cross section, so that the molten glass flowing evenly over both sides of the trough, is rejoined at the lower edge of the trough and drawn down to form a continuous band plate.

It has been mentioned that in this embodiment, two glass substrates 21 and 22 are used. However, instead of either one of them, a light transmitting substrate such as a resin substrate may be used. Here, a light transmitting substrate such as a resin substrate is included as a glass substrate. It is thereby possible to increase the flexibility of the plasma display panel 20. A resin substrate has low heat resistance or chemical resistance, and it is difficult to subject it to heat treatment or chemical treatment at the time of forming a transparent electrode film, etc. Further, a resin substrate has a large difference in thermal expansion from the glass substrates or the cover glass plate, whereby warpage is likely to occur. Therefore, it is preferred to use two glass substrates 21 and 22.

(Cover Glass Plate and its Peripheral Components)

The cover glass plate 30 is provided mainly for the purpose of improving the aesthetic impression and strength of the plasma display device 10 or prevention of impact failures. The cover glass plate 30 is bonded on the display side (the front side) of the plasma display panel 20.

For example, the cover glass plate 30 is bonded on the display side of the plasma display panel 20 via a light-transmitting adhesive film. The adhesive film may have a usual construction, and its material and shape may suitably be selected.

Thus, by adopting a construction free from an air gap between the cover glass plate 30 and the plasma display panel 20, it is possible to prevent reflection of light at the interface between the cover glass plate 30 (or the plasma display panel 20) and an air gap which used to be present. As a result, it is possible to improve the image quality of the plasma display device 10. Further, it is possible to contribute to reduction of the thickness of the plasma display device 10.

The cover glass plate 30 has a front surface 31 to emit light from the plasma display panel 20 and a back surface 32 to let light from the plasma display panel 20 enter. On the front surface 31 and/or the back surface 32, a function membrane 40 may be provided. In FIG. 1, a function membrane 40 is provided on the front surface 31.

The function membrane 40 may, for example, have functions such as antireflection of surrounding light, prevention of impact failures, shielding of electromagnetic waves, shielding of near infrared light, color compensation and/or improvement of scratch resistance.

The function membrane 40 may be formed, for example, by bonding a membrane made of a resin to the cover glass plate 30. Otherwise, the function membrane 40 may be formed by a thin film-forming method such as a vapor deposition method, a sputtering method or a CVD method.

The function membrane 40 may have a usual construction, and its thickness and shape, etc., may be suitably selected depending upon the particular application.

On the back surface 32 of the cover glass plate 30, a decorative layer 50 is provided along at least a part of the peripheral portion. Such a decorative layer 50 may be disposed to surround the outer periphery of the plasma display panel 20.

The decorative layer 50 is provided to improve design or decorative features of the cover glass plate 30 and the plasma display device 10. For example, if the decorative layer 50 is colored black, no light will be emitted from the front surface 31 of the cover glass plate 30 including the peripheral portion of the cover glass plate 30 when the plasma display device 10 is in an off state. Thus, the appearance of the plasma display device 10 presents a sharp impression to the user, whereby the aesthetic impression is improved.

The method for forming the decorative layer 50 is not limited, and for example, an ink containing organic pigment particles or inorganic pigment particles may be applied to the cover glass plate 30 and then subjected to ultraviolet irradiation or heating/firing to form a decorative layer. The ink may be prepared, for example, by mixing and dispersing organic pigment particles or inorganic pigment particles in an organic vehicle.

(Material, Characteristics, Etc. of Cover Glass Plate)

The thickness of the cover glass plate 30 is at most 1.5 mm, preferably at most 1.3 mm, further preferably at most 1.1 mm, with a view to reducing the thickness and weight. Further, the thickness of the cover glass plate 30 is preferably at least 0.5 mm from the viewpoint of the handling efficiency.

Figure 2:
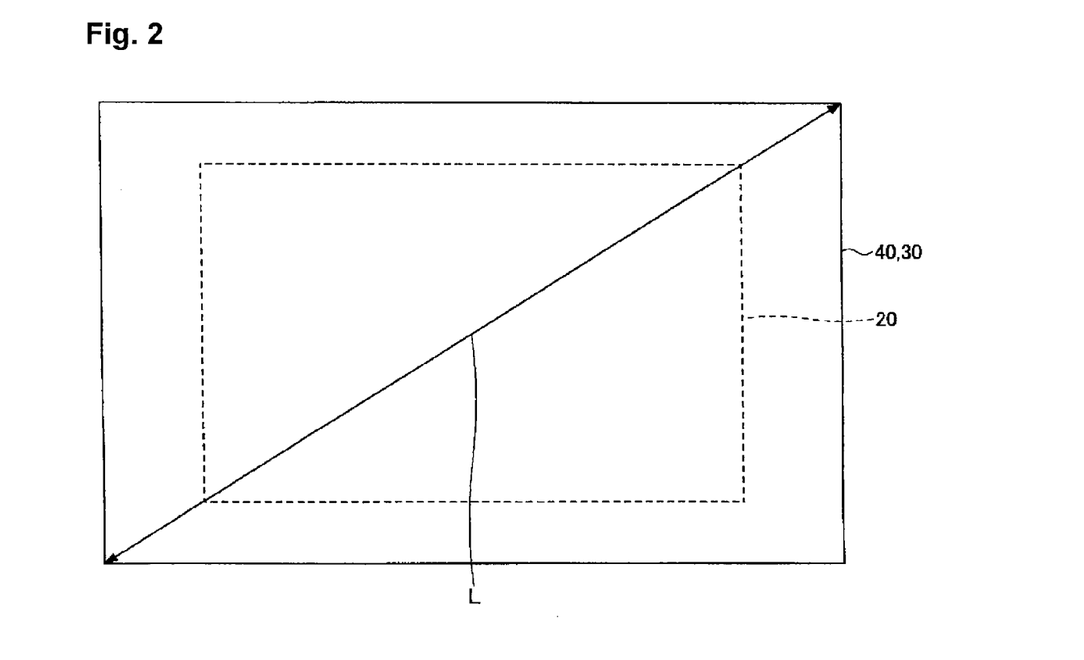
FIG. 2 is a front view of the plasma display device in FIG. 1.

The diagonal length L of the cover glass plate 30 is at least 81 cm (32 inches), preferably at least 94 cm (37 inches), further preferably at least 101 cm (40 inches) from the viewpoint of a large area.

The average thermal expansion coefficient (JIS R3102) of the cover glass plate 30 is from 80 to 120% of the average thermal expansion coefficient of the glass substrates 21 and 22 for the plasma display panel 20, in a range of from 50 to 350° C. Here, the glass substrates for the "plasma display panel" mean both glass substrates in a case where the plasma display panel have two glass substrates. That is, in a case where the two glass substrates of the plasma display panel have different average thermal expansion coefficients, the average thermal expansion coefficient of the cover glass plate is made to be from 80 to 120% to each of the average thermal expansion coefficients of the glass substrates 21 and 22 of the plasma display panel.

By adjusting the average thermal expansion coefficient of the cover glass plate 30 to be in the above range, it is possible to sufficiently reduce the difference in thermal expansion between the cover glass plate 30 and the glass substrates 21 and 22, and it is possible to sufficiently minimize the heat deformation of the cover glass plate 30 having a diagonal length of at least 32 inches (about 81.3 cm). A more preferred range is from 85 to 115%, and a particularly preferred range is from 90 to 110%.

Specifically, for example, it is possible to reduce warpage at the time when a heat is generated during the display operation of the plasma display device 10. Otherwise, in the process for producing a plasma display device 10, it is possible to reduce warpage at the time when the plasma display panel 20 and the cover glass plate 30 are fixed by a thermosetting adhesive. Such effects become remarkable as the areas (diagonal lengths) of the cover glass plate 30 and the glass substrates 21 and 22 become large.

The cover glass plate 30 may be formed of a material having the same composition as the glass substrate 21 or the glass substrate 22 in order to reduce warpage. With the same composition, it is also possible to reduce the production cost.

Further, the cover glass plate 30 is preferably a chemically tempered glass plate having a compression stress layer formed at least at a part of the surfaces by chemical tempering treatment, in order to improve the scratch resistance. As a method for chemical tempering treatment, an ion exchange method may, for example, be mentioned.

In the ion exchange method, a glass plate is immersed in a treating liquid to replace small ion radius ions (such as Na ions) contained in the surface layer of the glass plate with large ion radius ions (such as K ions), thereby to form a compression stress layer in the surface layer of the glass plate.

As the treating liquid, molten salt of potassium nitrate ($KNO_3$) may, for example, be used. Specific conditions may vary depending upon the thickness of the glass plate, but it is typical to immerse the glass plate in the $KNO_3$ molten salt at from 400 to 550° C. for from 2 to 20 hours. From the viewpoint of the economical efficiency, it is preferred to carry out the immersion under the conditions of from 400 to 500° C. for from 2 to 16 hours, and a more preferred immersion time is from 2 to 10 hours.

The cover glass plate 30 before chemical tempering treatment is not particularly limited, but it may, for example, be preferably glass A to glass D having the following composition.

(Glass A)

Glass A comprises, as represented by mol percentage based on oxides, from 55 to 70% of $SiO_2$, from 5 to 15% of $Al_2O_3$, from 4 to 20% of $Na_2O$ and from 1 to 15% of MgO, wherein the total amount of these components is at least 85%.

The average thermal expansion coefficient of glass A in a range of from 50 to 350° C. is typically from $66\times10^{-7}$ to $100\times10^{-7}$/° C. Further, the average thermal expansion coefficient of a chemically tempered glass plate obtained by chemical tempering of glass A is substantially the same as the average thermal expansion coefficient of glass A before the chemical tempering, since the thickness t of the compression stress layer is sufficiently small.

(Glass B)

Glass B comprises, as represented by mol percentage based on oxides, from 50 to 74% of $SiO_2$, from 1 to 10% of $Al_2O_3$, from 6 to 14% of $Na_2O$, from 3 to 15% of $K_2O$, from 2 to 15% of MgO, from 0 to 10% of CaO and from 0 to 5% of $ZrO_2$, wherein the total of contents of $SiO_2$ and $Al_2O_3$ is at most 75%, the total of contents of $Na_2O$ and $K_2O$ is from 12 to 25%, and the total of contents of MgO and CaO i.e. MgO+CaO is from 7 to 15%. Such glass B may be the following glasses B1 to B3.

Glass B1 is the above glass B wherein $Na_2O$ is at most 12%, $K_2O$ is at least 4%, $Na_2O+K_2O$ is at least 14%, MgO+CaO is at least 8% and the difference obtained by subtracting the $Al_2O_3$ content from $Na_2O+K_2O$ is at least 10%, and in a case where BaO is contained, its content is less than 1%.

In such glass B1, in a case where SrO or BaO is contained, the total of contents of alkaline earth metal oxides may be at most 15%.

In such glass B1, $SiO_2$ may be from 60 to 70%, $Al_2O_3$ may be from 2 to 8%, $Na_2O$ may be at most 11%, $K_2O$ may be from 6 to 12%, MgO may be from 4 to 14%, CaO may be from 0 to 8%, $ZrO_2$ may be from 0 to 4%, and $Na_2O+K_2O$ may be from 16 to 20%.

Glass B2 is the above glass B, wherein $SiO_2$ is from 60 to 70%, $Al_2O_3$ is from 2 to 8%, $K_2O$ is at most 8%, MgO is at least 6%, $Na_2O+K_2O$ is at most 18%, and the sum of the $Na_2O$ content and one having the $K_2O$ content multiplied by 1.7 i.e. $Na_2O+1.7K_2O$ is less than 19%.

Glass B3 is the above glass B, wherein $SiO_2$ is at least 63%, $Al_2O_3$ is at least 3%, $Na_2O$ is at least 8%, $K_2O$ is at most 8%, MgO is from 6 to 14%, CaO is from 0 to 1%, $ZrO_2$ is from 1 to 4%, and $Na_2O+K_2O$ is 14 to 17%.

In such glass B3, the sum of the $Na_2O$ content and one having the $K_2O$ content multiplied by 1.7 i.e. $Na_2O+1.7K_2O$ may be less than 19%.

In these glasses B (B1 to B3), the $K_2O$ content is sufficiently high so that it is possible to increase the thickness t of the compression stress layer without excessively increasing the ion exchange rate for chemical tempering. Accordingly, it is possible to increase the thickness t of the compression stress layer while maintaining the surface compression stress S to be e.g. less than 1,050 MPa, without separately applying polishing treatment after the chemical tempering treatment.

In the chemically tempered glass plate obtained by chemically tempering glass B, the thickness t of the compression stress layer is preferably more than 20 μm. If it is not more than 20 μm, the glass plate tends to be breakable. It is more preferably at least 30 μm, particularly preferably at least 40 μm, typically at least 45 μm or at least 50 μm.

Of the chemically tempered glass plate obtained by chemically tempering glass B, the surface compression stress S is typically at least 300 MPa and less than 1,050 MPa. If it is less than 300 MPa, the glass plate tends to be breakable. Further, of the chemically tempered glass plate obtained by chemically tempering glass B1, the surface compression stress S is typically at least 300 MPa and less than 750 MPa, and of the chemically tempered glass plate obtained by chemically tempering glass B2 or glass B3, the surface compression stress S is typically at least 700 MPa and less than 1,050 MPa.

The glass transition point Tg (hereinafter sometimes simply referred to as Tg) of glass B is typically from 540 to 610° C. in the case of glass B1, and typically from 580 to 640° C. in the case of glass B2 or B3.

The temperature $T_4$ (hereinafter sometimes simply referred to as $T_4$) at which the viscosity of glass B becomes $10^4$ dPa·s, is preferably at most 1,190° C. If it exceeds 1,190° C., molding of glass tends to be difficult. Typically, it is at most 1,180° C.

The temperature $T_2$ (hereinafter sometimes simply referred to as $T_2$) at which the viscosity of glass B becomes $10^2$ dPa·s, is preferably at most 1,650° C. If it exceeds 1,650° C., melting tends to be difficult, and product defects such as non-melted substances may increase, or the melting installation tends to be expensive. Typically, it is at most 1,600° C.

The devitrification temperature of glass B is preferably at most the above temperature $T_4$. Otherwise, devitrification is likely to occur and formation tends to be difficult when a float process is used. Here, the devitrification temperature is the maximum value of the temperature at which devitrification precipitates when the glass is held at that temperature for 15 hours.

The specific gravity p of glass B is preferably at most 2.6. If it exceeds 2.6, weight reduction of the plasma display device 10 tends to be inadequate.

The average thermal expansion coefficient α of glass B at from 50 to 350° C. is typically from $80 \times 10^{-7}$ to $130 \times 10^{-7}$/° C. Here, the average thermal expansion coefficient of a chemically tempered glass plate obtained by chemically tempering glass B is substantially the same as the average thermal expansion coefficient α of glass B before chemical tempering, since the thickness t of the compression stress layer is sufficiently small.

Among glasses B, glass B1 is a preferred embodiment in a case where it is desired to increase the thickness t of the compression stress layer while maintaining the surface compression stress S to be e.g. less than 750 MPa without separately applying polishing treatment after the chemical tempering treatment. Glasses B2 and B3 are preferred embodiments in a case where clarification during the production of glass is carried out by means of a sulfate.

Now, the composition of glass B will be described by using contents as represented by mol percentage, unless otherwise specified.

$SiO_2$ is a component to constitute the network structure of glass and thus is essential. If it is less than 50%, the stability as glass decreases, or the weather resistance decreases. It is preferably at least 60%. Further, in glass B2, it is at least 60%, preferably at least 62%, and in glass B3, it is at least 63%.

If $SiO_2$ exceeds 74%, the viscosity of glass increases, and the melting property remarkably decreases. It is preferably at most 70%, typically at most 68%. Further, in glass B2, $SiO_2$ is at most 70%.

$Al_2O_3$ is a component to improve the ion exchange rate and thus is essential. If it is less than 1%, the ion exchange rate decreases. It is preferably at least 2%, typically at least 3%. Further, in glass B2, $Al_2O_3$ is at least 2%, and in glass B3, it is at least 3%.

If $Al_2O_3$ exceeds 10%, the viscosity of glass becomes high, and uniform melting tends to be difficult. It is preferably at most 9%, more preferably at most 8%, typically at most 7%. Further, in glass B2, $Al_2O_3$ is at most 8%.

If the total of contents of $SiO_2$ and $Al_2O_3$ exceeds 75%, the viscosity of glass at a high temperature increases, and melting tends to be difficult. Typically, it is at most 72%. On the other hand, the total is preferably at least 66%. If it is less than 66%, stable glass tends to be hardly obtainable, and the weather resistance tends to decrease, and it is typically at least 68%.

$Na_2O$ is a component to let a compression stress layer form by ion exchange and to improve the melting property of glass, and thus is essential. If it is less than 6%, it tends to be difficult to form a desired compression stress layer by ion exchange. It is preferably at least 7%, typically at least 8%. Further, in glass B3, $Na_2O$ is at least 8%.

If $Na_2O$ exceeds 14%, Tg, accordingly the strain point, becomes low, or the weather resistance decreases. It is preferably at most 13%, typically at most 12%. Further, in glass B1, $Na_2O$ is at most 12%, preferably at most 11%, typically at most 10%.

$K_2O$ is a component to improve the melting property and at the same time is a component to increase the ion exchange rate in chemical tempering thereby to obtain the desired surface compression stress S and the desired thickness t of the compression stress layer and thus is essential. If it is less than 3%, the melting property decreases, or the ion exchange rate decreases. It is typically at least 4%.

Further, in glass B1, $K_2O$ is at least 4%, preferably at least 5%, more preferably at least 6%, typically at least 7%. Further, the content of $K_2O$ as represented by mass percentage is typically at least 3%.

If $K_2O$ exceeds 15%, the weather resistance decreases. It is preferably at most 12%, typically at most 11%. Further, in glass B2 or glass B3, $K_2O$ is at most 8%, preferably at most 7%, typically at most 6%.

If the total $R_2O$ of contents of $Na_2O$ and $K_2O$ is less than 12%, the desired ion exchange properties tend to be hardly obtainable. It is preferably at least 13%, more preferably at least 14%. Further, in glass B1 or glass B3, $R_2O$ is at least 14%, and in glass B1, it is at least 16%, more preferably at least 16.5%, typically at least 17%.

If $R_2O$ (the total amount of $Na_2O$ and $K_2O$) exceeds 25%, the chemical durability including the weather resistance of glass tends to be low. It is preferably at most 22%, more preferably at most 20%, typically at most 19%. Further, in glass B2, $R_2O$ is at most 18%, and in glass B3, it is at most 17%, in order to e.g. lower the basicity of glass and to improve the clarification by means of a sulfate.

In glass B2, the above $Na_2O+1.7K_2O$ is made to be less than 19% in order to e.g. lower the basicity of glass and improve the clarification by means of a sulfate. Also in glass B3, $Na_2O+1.7K_2O$ is preferably less than 19%. Here, "to lower the basicity of glass and improve the clarification by means of a sulfate" means that in the case of the clarification by means of sodium sulfate, the decomposition temperature of sodium sulfate is made to be at most about 1,500° C.

The difference obtained by deducting the $Al_2O_3$ content from the above $R_2O$ (the total amount of $Na_2O$ and $K_2O$) i.e. $R_2O-Al_2O_3$ is preferably at least 10%. If it is less than 10%, it is worried that the thickness t of the compression stress layer becomes small. It is considered that the thickness t of the compression stress layer becomes small, because Tg, accordingly, the strain point, becomes high. Further, in glass B1, $R_2O-Al_2O_3$ is at least 10%.

The difference obtained by deducting $R_2O$ (the total amount of $Na_2O$ and $K_2O$) from the total of contents of $SiO_2$ and $Al_2O_3$, is preferably at most 60%. If it exceeds 60%, the above-mentioned $T_2$ tends to exceed 1,650° C., whereby the melting tends to be difficult.

$Li_2O$ is a component to lower the strain point to facilitate the stress relaxation thereby to make it difficult to obtain a stabilized compression stress layer and should better be not contained, and even in a case where it is contained, its content is preferably at most 2%, more preferably at most 0.05%, particularly preferably less than 0.01%.

Figure 3:
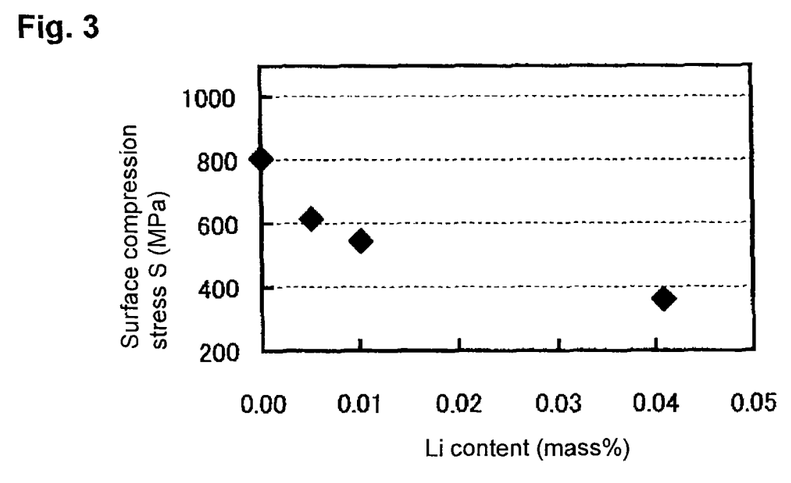
FIG. 3 is a graph showing the relation between the Li content (mass %) in molten salt ($KNO_3$) and the surface compression stress S (MPa) of glass after chemical tempering treatment.

Further, $Li_2O$ may sometimes elute into a molten salt such as $KNO_3$ during chemical tempering treatment. If chemical tempering treatment is carried out by using a molten salt containing Li, the surface compression stress S remarkably decreases. That is, the present inventors have carried out chemical tempering treatment of glass in the after-mentioned Material Example 19 by using $KNO_3$ containing no Li and $KNO_3$ containing 0.005 mass %, 0.01 mass % or 0.04 mass % of Li, under conditions of 450° C. for 6 hours, whereby as shown in FIG. 3, it has been found that the surface compression stress remarkably decreases when the molten salt contains Li in an amount of only 0.005 mass %. Thus, from this viewpoint, it is preferred not to contain $Li_2O$.

The ratio of the content of $K_2O$ to the total content of alkali metal oxides is preferably at least 0.25, more preferably at least 0.4, typically more than 0.5.

Alkaline earth metal oxides are components to improve the melting property and components effective for adjusting Tg, accordingly the strain point.

Among alkaline earth metal oxides, BaO has a highest effect to lower the ion exchange rate, and therefore, BaO is preferably not contained, or even if contained, its content is preferably less than 1%, and in glass B1, even if it is contained, its content should be less than 1%.

SrO may be contained, as the case requires, however, it has a higher effect to lower the ion exchange rate as compared with MgO or CaO, and therefore, even if it is contained, its content is preferably less than 1%.

In a case where SrO and/or BaO is contained, the total of their contents is preferably at most 3%, more preferably less than 2%.

MgO and CaO have a relatively low effect to reduce the ion exchange rate, and at least MgO is contained in an amount of at least 2%.

If MgO is less than 2%, the melting property decreases. It is preferably at least 4%, more preferably at least 6%, typically at least 6.5%. Further, in glass B2 or glass B3, MgO is at least 6%, preferably at least 6.5%, typically at least 10%.

If MgO exceeds 15%, the ion exchange rate decreases. It is preferably at most 14%, more preferably at most 13.5%. Further, in glass B1, MgO is particularly preferably at most 13%, typically at most 12%, and in glass B3, MgO is at most 14%.

In a case where CaO is contained, its content is typically at least 1%. If its content exceeds 10%, the ion exchange rate decreases. It is preferably at most 8%, typically at most 6%. Further, in glass B2, even if CaO is contained, its content is typically at most 1%, and in glass B3, its content must be at most 1%.

In a case where CaO is contained, the content ratio of MgO to CaO is preferably at least 1, more preferably at least 1.1.

The total of contents of MgO and CaO i.e. MgO+CaO is from 7 to 15%, typically at least 8%, and in glass B1, it must be at least 8%. Further, the total of contents as represented by mass percentage of MgO and CaO is typically at least 5.1%.

The ratio of MgO+CaO to the content of $Al_2O_3$ is preferably at least 1.2, typically at least 1.5.

The total RO of contents of alkaline earth metal oxides is preferably more than 2% and at most 15%. If it is 2% or lower, the melting property decreases, or adjustment of the strain point tends to be difficult. It is preferably at least 4%, more preferably at least 6%, typically at least 8%. If it exceeds 15%, the ion exchange rate decreases, devitrification is likely to occur, or the strain point is likely to be too low.

Figure 4:
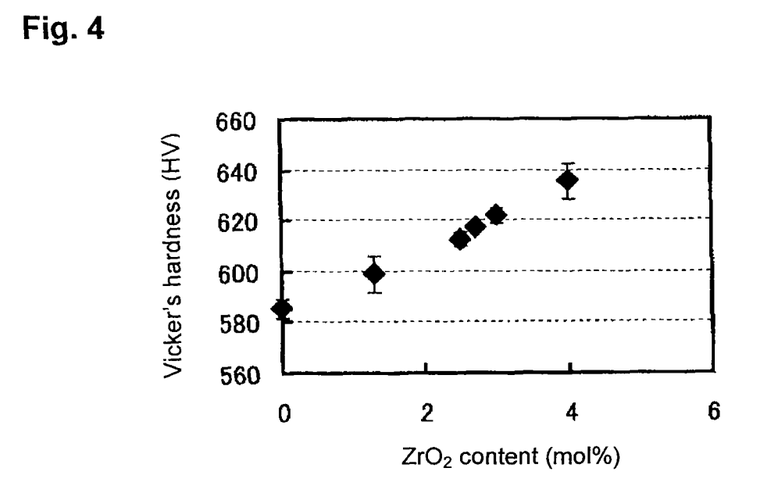
FIG. 4 is a graph showing the relation between the $ZrO_2$ content (mol %) in glass and the Vickers hardness (HV) of glass after chemical tempering treatment.

In glass B except for glass B3, $ZrO_2$ is not essential, but it may be contained in a range of up to 5% in order to increase the ion exchange rate. If it exceeds 5%, the effect to increase the ion exchange rate will be saturated, or the melting property deteriorates, whereby non-melted substance may remain in glass. Further, as shown in FIG. 4, by incorporating $ZrO_2$, the vicker's hardness of glass after the chemical tempering treatment increases. Particularly, the tendency shown in FIG. 4 is likewise observed with respect to not only glasses in Material Examples 5, 9 and 10 given hereinafter, but also (1) glass comprising, as represented by mol percentage, 64.0% of $SiO_2$, 5.4% of $Al_2O_3$, 9.6% of $Na_2O$, 9.1% of $K_2O$, 5.4% of MgO, 4.0% of CaO and 2.5% of $ZrO_2$, (2) glass comprising, as represented by mol percentage, 64.0% of $SiO_2$, 5.3% of $Al_2O_3$, 9.6% of $Na_2O$, 9.1% of $K_2O$, 5.2% of MgO, 4.0% of CaO and 2.7% of $ZrO_2$ and (3) glass comprising, as represented by mol percentage, 66.8% of $SiO_2$, 11.0% of $Al_2O_3$, 13.1% of $Na_2O$, 2.5% of $K_2O$, 6.1% of MgO and 0.6% of CaO. $ZrO_2$ is preferably at most 4%, typically at most 2%. When $ZrO_2$ is contained, its content is preferably at least 0.5%, typically at least 1%.

In glass B3, $ZrO_2$ is essential and is contained in an amount of from 1 to 4%, typically from 1.5 to 3%.

Glass B consists essentially of the above-described components, but may contain other components within a range not to impair the effects of glass B. When such other components are contained, the total of contents of such other components is preferably at most 10%, typically at most 5%. Now, such other components will be exemplified.

ZnO may sometimes be contained, for example, up to 2% in order to improve the melting property of glass at a high temperature, but it is preferably at most 1%. For example, in a case where the production is carried out by a float process, it is preferably adjusted to be at most 0.5%. If it exceeds 0.5%, it is likely to be reduced during the float forming, thus leading to product defects. Typically, ZnO is not contained.

$B_2O_3$ may sometimes be contained, for example, up to 1% in order to improve the glass strength or the melting property at a high temperature. If it exceeds 1%, homogeneous glass tends to be hardly obtainable, and forming of glass tends to be difficult. Typically, $B_2O_3$ is not contained.

If present in glass, $TiO_2$ is likely to change the redox status of Fe ions ($Fe^{2+}$, $Fe^{3+}$) present in glass thereby to change the visible light transmittance to cause coloration of glass. Therefore, even if it is contained, its content is preferably at most 1%, and typically it is not contained.

As a clarifying agent at the time of melting glass, $SO_3$, a chloride, a fluoride, etc. may suitably be contained. However, in order to improve the image quality, it is preferred to reduce, as far as possible, components which may be included as impurities in raw materials such as $Fe_2O_3$, NiO, $Cr_2O_3$, etc. having absorption in a visible range, and each of them is preferably at most 0.15%, more preferably at most 0.05%, as represented by mass percentage.

(Glass C)

Glass C comprises, as represented by mol percentage based on oxides, from 68 to 80% of $SiO_2$, from 4 to 10% of $Al_2O_3$, from 5 to 15% of $Na_2O$, from 0 to 1% of $K_2O$, from 4 to 15% of MgO and from 0 to 1% of $ZrO_2$, wherein the total of contents of $SiO_2$ and $Al_2O_3$ i.e. $SiO_2+Al_2O_3$ is at most 85%.

In such glass C, $Al_2O_3$ is preferably at least 4.5%. Further, in such glass C, $SiO_2+Al_2O_3$ is preferably at least 75%. Further, in such glass C, it is more preferred that $SiO_2$ is from 70 to 75%, $Al_2O_3$ is at least 5%, $Na_2O$ is at least 8%, MgO is from 5 to 12%, and $SiO_2+Al_2O_3$ is from 77 to 83%.

Further, in such glass C, CaO may not be contained, or even if CaO is contained, its content may be less than 1%.

Further, in such glass C, in a case where at least one component of CaO, SrO, BaO and $ZrO_2$ is contained, the total of contents of these four components is more preferably less than 1.5%.

By such glass C, it is possible to sufficiently improve the strength by a chemical tempering method, and yet, it is possible to prevent formation (extension) of a crack starting from an indentation formed at the time of using glass after chemical tempering.

Of a chemically tempered glass plate obtained by chemically tempering glass C, the surface compression stress S is preferably at least 550 MPa, and typically at most 1,200 MPa.

Of the chemically tempered glass plate obtained by chemically tempering glass C, the thickness t of the compression stress layer is preferably more than 10 μm and typically at most 70 μm.

The chemically tempered glass plate obtained by chemically tempering glass C is preferably one which is not breakable even when a force of 5 kgf=49 N is exerted by a vicker's indenter of a vicker's hardness meter. It is more preferably one which is not breakable even when a force of 7 kgf is exerted, and it is particularly preferably one which is not breakable even when a force of 10 kgf is exerted.

The glass transition point Tg of glass C is preferably at least 400° C. If it is less than 400° C., the surface compression stress tends to be relaxed at the time of ion exchange, whereby no adequate stress may be obtainable.

The temperature $T_2$ at which the viscosity of glass C becomes $10^2$ dPa·s, is preferably at most 1,750° C.

The temperature $T_4$ at which the viscosity of glass C becomes $10^4$ dPa·s, is preferably at most 1,350° C.

The specific gravity ρ of glass C is preferably at most 2.50.

The Young's modulus E of glass C is preferably at least 68 GPa. If it is less than 68 GPa, the cracking resistance or breaking strength of glass tends to be inadequate.

The Poisson's ratio σ of glass C is preferably at most 0.25. If it exceeds 0.25, the cracking resistance of glass tends to be inadequate.

The average thermal expansion coefficient α of glass C at from 50 to 350° C. is typically from $57\times10^{-7}$ to $81\times10^{-7}$/° C. Further, the average thermal expansion coefficient of a chemically tempered glass plate obtained by chemically tempering glass C is substantially the same as the average thermal expansion coefficient α of glass C before chemical tempering, since the thickness t of the compression stress layer is sufficiently small.

Now, the composition of the glass C will be described by using contents as represented by mol percentage unless otherwise specified.

$SiO_2$ is a component to constitute the network structure of glass and thus is essential. Further, it is a component to reduce cracking when the glass surface is scratched. If it is less than 68%, the stability or weather resistance as glass, or the chipping resistance decreases. It is preferably at least 70%. If $SiO_2$ exceeds 80%, the viscosity of the glass increases, and the melting property decreases. It is preferably at most 75%.

$Al_2O_3$ is a component to improve the ion exchange performance and the chipping resistance and thus is essential. If it is less than 4%, it tends to be difficult to obtain a desirable surface compression stress value or stress layer depth. It is preferably at least 4.5%, more preferably at least 5%. If it exceeds 10%, the viscosity of glass tends to be high, and homogeneous melting tends to be difficult.

If the total of contents of $SiO_2$ and $Al_2O_3$ i.e. $SiO_2+Al_2O_3$ exceeds 85%, the viscosity of glass at a high temperature increases, and melting tends to be difficult. It is preferably at most 83%. On the other hand, $SiO_2+Al_2O_3$ is preferably at least 75%. If it is less than 75%, the cracking resistance decreases when an indentation is formed. It is more preferably at least 77%.

$Na_2O$ is a component to let a compression stress layer form by ion exchange and to improve the melting property of glass and thus is essential. If it is less than 5%, it tends to be difficult to form a desired compression stress layer by ion exchange. It is preferably at least 8%. If $Na_2O$ exceeds 15%, the weather resistance decreases, and cracking is likely to start from an indentation.

$K_2O$ is not essential but may be contained up to 1% in order to increase the ion exchange rate. If it exceeds 1%, cracking is likely to start from an indentation.

MgO is a component which may lower the ion exchange rate, but it is a component to prevent cracking or to improve the melting property and thus is essential. If it is less than 4%, the viscosity increases, and the melting property decreases. It is preferably at least 5%. If it exceeds 15%, the glass tends to devitrify. It is preferably at most 12%.

$ZrO_2$ is not essential but may be contained within a range of up to 1% in order to lower the viscosity at a high temperature or to increase the surface compression stress. If it exceeds 1%, the possibility of cracking to start from an indentation is likely to be high.

Glass C consists essentially of the above-described components, but may contain other components within a range not to impair the effects of glass C. When such other components are contained, the total of contents of such other components is preferably at most 5%, typically at most 3%. Now, such other components will be exemplified.

ZnO may sometimes be contained up to 2%, for example, in order to improve the melting property of glass at a high temperature, but it is preferably at most 1%. For example, in a case where a float process is used for the production, it is preferably adjusted to be at most 0.5%. If it exceeds 0.5%, it is likely to be reduced during the float forming thus leading to product defects. Typically, ZnO is not contained.

$B_2O_3$ may sometimes be contained within a range of less than 1%, for example, in order to improve the glass strength or the melting property at a high temperature. If it is 1% or more, it tends to be difficult to obtain homogeneous glass, molding of glass tends to be difficult, or the chipping resistance tends to decrease. Typically, $B_2O_3$ is not contained.

$TiO_2$ is likely to lower the visible light transmittance when it is coexistent with Fe ions present in glass, and it is likely to color the glass brown, and therefore, even when it is contained, its content is preferably at most 1%. Typically, it is not contained.

$Li_2O$ is a component to lower the strain point to facilitate stress relaxation and consequently make it difficult to obtain a stabilized surface compression stress layer, and thus is preferably not contained, and even when it is contained, its content is preferably less than 1%, more preferably at most 0.05%, particularly preferably less than 0.01%.

Further, $Li_2O$ may sometimes elute into a molten salt such as $KNO_3$ during chemical tempering treatment, and if chemical tempering treatment is carried out by using a molten salt containing Li, the surface compression stress remarkably decreases. That is, the present inventors have carried out chemical tempering treatment of glass in Material Example 76 given hereinafter, by using $KNO_3$ containing no Li and $KNO_3$ containing 0.005 mass %, 0.01 mass % and 0.04 mass % of Li under conditions of 450° C. for 6 hours, whereby it was found that the surface compression stress remarkably decreases when the molten salt contains Li in an amount of only 0.005 mass %. Thus, from this viewpoint, $Li_2O$ is preferably not contained.

CaO may be contained within a range of less than 1% in order to improve the melting property at a high temperature or to prevent devitrification. If it is 1% or more, the ion exchange rate or the resistance against cracking tends to decrease. Typically, CaO is not contained.

SrO may be contained as the case requires, but it has a higher effect to lower the ion exchange rate, as compared with MgO or CaO, and therefore, even when it is contained, its content is preferably less than 1%. Typically, SrO is not contained.

Among alkaline earth metal oxides, BaO has the highest effect to lower the ion exchange rate, and therefore, it is preferred that BaO is not contained, or even when contained, its content is preferably less than 1%.

When SrO and/or BaO is contained, the total of their contents is preferably at most 1%, more preferably less than 0.3%.

In a case where at least one of CaO, SrO, BaO and $ZrO_2$ is contained, the total of contents of such four components is preferably less than 1.5%. If it is 1.5% or more, the ion exchange rate is likely to decrease. Typically, it is at most 1%.

As a clarifying agent at the time of melting glass, $SO_3$, a chloride, a fluoride, etc. may suitably be contained. However, in order to improve the image quality, it is preferred to minimize components which may be included as impurities in raw materials such as $Fe_2O_3$, NiO, $Cr_2O_3$, etc. having absorption in the visible region, and each of them is preferably at most 0.15%, more preferably at most 0.05%, as represented by mass percentage.

(Glass D)

Glass D comprises, as represented by mol percentage based on oxides, from 61 to 66% of $SiO_2$, from 6 to 12% of $Al_2O_3$, from 7 to 13% of MgO, from 9 to 17% of $Na_2O$ and from 0 to 7% of $K_2O$, wherein when $ZrO_2$ is contained, its content is at most 0.8%.

Now, the composition of glass D will be described by using contents as represented by mol percentage unless otherwise specified.

$SiO_2$ is a component to constitute the network structure of glass and thus is essential. If it is less than 61%, the strength is likely to decrease when an indentation is imparted, cracking is likely to occur when the glass surface is scratched, the weather resistance decreases, the specific gravity increases, or the liquid phase temperature increases whereby glass tends to be unstable. It is preferably at least 61.5%, more preferably at least 62%, particularly preferably at least 63%. If $SiO_2$ exceeds 66%, $T_2$ or $T_4$ increases, whereby melting or molding of glass tends to be difficult. It is preferably at most 65.5%. In a case where it is desired to more efficiently prevent the decrease in strength when an indentation is formed on the glass surface, $SiO_2$ is typically from 63 to 65%. Further, the content of $SiO_2$ as represented by mass percentage is typically less than 64%.

$Al_2O_3$ is a component to improve the ion exchange performance and the weather resistance and is essential. If it is less than 6%, a decrease in strength is likely to occur when an indentation is formed, or it tends to be difficult to obtain the desired surface compression stress S or stress layer thickness t by ion exchange. It is preferably at least 6.5%, more preferably at least 7%, particularly preferably at least 7.5%. If it exceeds 12%, $T_2$ or $T_4$ increases, whereby melting or molding of glass tends to be difficult, or the liquid phase temperature tends to be high, whereby devitrification is likely to occur. It is preferably at most 11.5%.

The total of contents of $SiO_2$ and $Al_2O_3$ is preferably at least 71%. If it is less than 71%, the strength is likely to decrease when an indentation is formed. It is typically more than 72%.

MgO is a component which may lower the ion exchange rate, but it is a component to prevent cracking and to improve the melting property and thus is essential. If it is less than 7%, $T_2$ or $T_4$ increases, whereby melting or molding of glass tends to be difficult. It is preferably at least 7.5%, more preferably at least 8%. If it exceeds 13%, the liquid phase temperature increases, whereby devitrification is likely to occur. It is preferably at most 12.5%, more preferably at most 12%. In a case where it is desired to more efficiently prevent a decrease in strength when an indentation is formed on a glass surface, MgO is typically from 8 to 11%.

$Na_2O$ is a component to let a surface compression stress layer form by ion exchange or to improve the melting property of glass and is essential. If it is less than 9%, it tends to be difficult to form a desired surface compression stress layer by ion exchange. It is preferably at least 9.5%, more preferably at least 10%, particularly preferably at least 10.5%. If $Na_2O$ exceeds 17%, the weather resistance decreases, or cracking is likely to start from an indentation. It is preferably at most 16%.

$K_2O$ is not essential but is a component to increase the ion exchange rate and may be contained up to 7%. If it exceeds 7%, cracking is likely to start from an indentation. It is preferably at most 6.5%, more preferably at most 6%. In a case where $K_2O$ is contained, its content is preferably at least 0.5%.

In a case where $K_2O$ is contained, the total $R_2O$ of contents of $Na_2O$ and $K_2O$ is preferably at most 22%. If it exceeds 22%, the weather resistance decreases, or cracking is likely to start from an indentation. It is preferably at most 21%, more preferably at most 20%. On the other hand, $R_2O$ is preferably at least 14%, typically at least 15%.

In a case where it is desired to more efficiently prevent a decrease in strength when an indentation is formed on a glass surface, typically, $Na_2O$ is from 11 to 16%, $K_2O$ is from 0 to 5%, and $R_2O$ (the total content of $Na_2O$ and $K_2O$) is from 15 to 17%, and in a case where the $K_2O$ content is less than 3%, $Na_2O$ is typically from 13.5 to 16%.

For example, in a case where it is desired to increase Tg, the difference obtained by deducting the $Al_2O_3$ content from $R_2O$ (the total content of $Na_2O$ and $K_2O$) i.e. $R_2O-Al_2O_3$ is preferably less than 10%.

$ZrO_2$ is likely to lower the strength when an indentation is formed on a glass surface and is therefore not an essential component, but it may be contained within a range of up to 0.8% in order to e.g. lower the viscosity at a high temperature or to increase the surface compression stress. If it exceeds 0.8%, the strength is likely to decrease when an indentation is formed, or chipping is likely to occur. It is preferably at most 0.7%, more preferably at most 0.6%, particularly preferably at most 0.55%.

Glass D of the present invention consists essentially of the above-described components, but may contain other components within a range not to impair the purpose of the present invention. In a case where such other component are contained, the total of contents of such other components is preferably at most 5%, typically at most 3%. It is particularly preferred that the total of contents of $SiO_2$, $Al_2O_3$, MgO, $Na_2O$ and $K_2O$ is at least 98%. Now, such other components will be exemplified.

CaO, SrO and BaO may be contained in order to improve the melting property at a high temperature or to prevent devitrification, but the ion exchange rate or the resistance against cracking is likely to decrease. In a case where at least one of CaO, SrO and BaO is contained, the content of each component is preferably at most 1%, more preferably at most 0.5%. Further, in such a case, the total of contents of these three components is preferably at most 1%, more preferably at most 0.5%.

ZnO may sometimes be contained in order to improve the melting property of glass at a high temperature, but in such a case, the content is preferably at most 1%. In a case where a float process is used for the production, it is preferably adjusted to be at most 0.5%. If it exceeds 0.5%, it is likely to be reduced during the float forming thus leading to product defects. Typically, ZnO is not contained.

$B_2O_3$ may sometimes be contained within a range of less than 1%, for example, in order to improve the glass strength or the melting property at a high temperature. If it is 1% or more, it tends to be difficult to obtain homogeneous glass, molding of glass tends to be difficult, or the chipping resistance tends to decrease. Typically, $B_2O_3$ is not contained.

$TiO_2$ is likely to lower the visible light transmittance when it is coexistent with Fe ions present in glass, and it is likely to color the glass brown, and therefore, even when it is contained, its content is preferably at most 1%. Typically, it is not contained.

$Li_2O$ is a component to lower the strain point to facilitate stress relaxation and consequently make it difficult to obtain a stabilized surface compression stress layer, and thus is preferably not contained, and even when it is contained, its content is preferably less than 1%, more preferably at most 0.05%, particularly preferably less than 0.01%.

As a clarifying agent at the time of melting glass, $SO_3$, a chloride, a fluoride, etc. may suitably be contained. However, in order to increase the visibility of a display device such as a touch panel, it is preferred to minimize components which may be included as impurities in raw materials such as $Fe_2O_3$, NiO, $Cr_2O_3$, etc. having absorption in the visible region, and each of them is preferably at most 0.15%, more preferably at most 0.1%, particularly preferably at most 0.05%, as represented by mass percentage.

EXAMPLES

Now, the present invention will be described in detail with reference to Examples, etc., but it should be understood that the present invention is by no means restricted by such Examples.
(Material for Cover Glass Plate)

Material Examples 1 to 57

Glasses in Material Examples 1 to 37 are ones which satisfy the composition of the above-mentioned glass B, and glasses in Material Examples 38 to 57 are Comparative Examples to the above glass B and ones which depart from the composition of the above glass B. Material Example 84 relates to the above-mentioned glass D and is one which satisfies the composition of the above-mentioned glass D.

With respect to Material Examples 1 to 17, 19 to 35, 38 to 47 and 84, commonly-employed glass raw materials such as oxides, hydroxides, carbonates, nitrates, etc. were suitably selected to bring the compositions as shown by mol percentage in the rows for from $SiO_2$ to $ZrO_2$ (or $Li_2O$ or $TiO_2$) in Tables 1 to 5 and 19, and they were weighed to be 400 g as glass, and although not shown in the above compositions, sodium sulfate corresponding to 0.4 mass % as calculated as $SO_3$ was added, followed by mixing. Then, the mixture was put into a platinum crucible, which was introduced into a resistance heating electric furnace at 1,600° C. and melted, defoamed and homogenized for 3 hours, and then cast into a mold and annealed at a predetermined temperature to obtain a glass block. From this glass block, a sample having a size of 40 mm×40 mm and a thickness of 0.8 mm was cut out, and ground, and finally, both surfaces were mirror polished to obtain a plate glass.

In the Tables, "$R_2O$–Al" represents one obtained by deducting the $Al_2O_3$ content from the above $R_2O$ (the total content of $Na_2O$ and $K_2O$), "Na+1.7K" represents the sum of the $Na_2O$ content and one having the $K_2O$ content multiplied by 1.7, and the compositions represented by mass percentage which correspond to the compositions represented by mol percentage in Tables 1 to 5 and 19, are shown in Tables 7 to 11 and 20.

Further, Material Examples 18, 36, 37 and 48 to 57 are Examples wherein no such melting was carried out, and Material Example 47 is an Example of separately prepared soda lime silica glass.

With respect to these glasses, the following chemical tempering treatment was carried out. That is, each of these glasses was immersed for 6 hours in a molten salt of $KNO_3$ at 450° C. to carry out chemical tempering treatment. With respect to each glass, the surface compression stress S (unit: MPa) and the thickness t (unit: μm) of the compression stress layer were measured by means of a surface stress meter FSM-6000, manufactured by Orihara Manufacturing Co., LTD. The results are shown in the corresponding rows in Tables 1 to 6. As is evident from the Tables, one using glass B had S of at least 300 MPa and at most 1,024 MPa and t of at least 45 μm, thus indicating formation of the desired compression stress layer.

Further, S and t in Material Examples 18, 36, 37, 48 to 57 and 84, were obtained by calculation from the compositions.

Further, in the Material Examples 5, 40, 47 and 84, the glass transition point Tg (unit: ° C.), the temperature $T_2$ (unit: ° C.) at which the viscosity became $10^2$ dPa·s, the temperature $T_4$ (unit: ° C.) at which the viscosity became $10^4$ dPa·s, the specific gravity ρ, and the average thermal expansion coefficient α (unit: $10^{-7}$/° C.) were measured. Further, in Material Examples 19 and 20, Tg, $T_2$, $T_4$ and α were measured, and in Material Examples 24 to 26, Tg and α were measured. The results are shown in the corresponding rows in Tables. Further, in other Material Examples, these values were obtained by calculation from the compositions. The results are shown in Tables.

Further, in Material Examples 1, 4 to 10, 15 to 17, 19 to 35, 40, 43 to 47 and 84, a test relating the devitrification was carried out as follows. That is, a test was carried out to see whether or not devitrification will form in glass when the glass is maintained for 15 hours at the temperature $T_4$. In the row for "D" in Tables, ○ shows that no devitrification formed by the above test, and × shows that devitrification formed.

Further, Δ shows a case where devitrification formed at the temperature $T_4$, but no vitrification formed at $(T_4+40°$ C.).

In Material Examples 19 to 35, a test relating to decomposition of a sulfate was carried out as follows. That is, the amounts of $SO_3$ remaining in glass were measured at 1,350° C. and 1,500° C., and the difference Δ was calculated (unit: mass %). In order to reduce foams in glass, Δ is preferably at least 0.08 mass %. In Material Examples 36 and 48 to 57, a value Δ estimated from the composition is shown. Here, one having an estimated value Δ of from 0.4 to 0.9 mass %, is shown as "0.08" in Tables.

TABLE 1

| Ex. | 1 | 2 | 3 | 4 | 5 | 6 | 7 | 8 | 9 | 10 |
|---|---|---|---|---|---|---|---|---|---|---|
| $SiO_2$ | 67.4 | 65.2 | 65.2 | 63.0 | 63.5 | 64.5 | 66.4 | 62.6 | 63.3 | 63.5 |
| $Al_2O_3$ | 3.7 | 6.0 | 6.0 | 5.0 | 5.0 | 5.0 | 3.0 | 5.7 | 4.9 | 4.7 |
| MgO | 12.2 | 9.5 | 7.5 | 10.6 | 8.0 | 2.7 | 7.2 | 9.6 | 6.1 | 4.9 |
| CaO | 1.1 | 0 | 2.0 | 2.0 | 4.0 | 8.0 | 4.0 | 4.0 | 4.0 | 4.0 |
| SrO | 0.6 | 0 | 0 | 0 | 0 | 0 | 0 | 0 | 0 | 0 |
| $Na_2O$ | 8.1 | 9.0 | 9.0 | 9.3 | 9.4 | 9.5 | 9.3 | 9.2 | 9.6 | 9.7 |
| $K_2O$ | 6.3 | 9.0 | 9.0 | 8.8 | 8.9 | 9.0 | 8.9 | 8.8 | 9.1 | 9.2 |
| $ZrO_2$ | 0.7 | 1.3 | 1.3 | 1.3 | 1.3 | 1.3 | 1.3 | 0 | 3.0 | 4.0 |
| RO | 13.9 | 9.5 | 9.5 | 12.6 | 12.0 | 10.7 | 11.2 | 13.6 | 10.1 | 8.9 |
| $R_2O$ | 14.4 | 18.0 | 18.0 | 18.1 | 18.3 | 18.5 | 18.1 | 18.0 | 18.7 | 18.9 |
| $R_2O$—Al | 10.7 | 12.0 | 12.0 | 13.1 | 13.3 | 13.5 | 15.1 | 12.3 | 13.7 | 14.2 |
| Na + 1.7K | 38.4 | 40.1 | 40.1 | 43.4 | 43.1 | 42.2 | 42.0 | 44.2 | 41.9 | 41.0 |
| S | 630 | 581 | 566 | 586 | 551 | 480 | 466 | 535 | 629 | 629 |
| t | 50 | 83 | 70 | 64 | 57 | 49 | 57 | 61 | 56 | 56 |
| Tg | 579 | 582 | 567 | 579 | 572 | 554 | 549 | 581 | 587 | 604 |
| $T_2$ | 1549 | 1588 | 1565 | 1520 | 1518 | 1520 | 1520 | 1520 | 1520 | 1520 |
| $T_4$ | 1125 | 1163 | 1151 | 1108 | 1097 | 1093 | 1094 | 1098 | 1117 | 1122 |
| D | ○ | — | — | ○ | ○ | ○ | ○ | ○ | ○ | × |
| ρ | 2.59 | 2.48 | 2.50 | 2.52 | 2.53 | 2.54 | 2.51 | 2.49 | 2.56 | 2.58 |
| α | 90 | 100 | 101 | 104 | 105 | 107 | 104 | 106 | 105 | 104 |

TABLE 2

| Ex. | 11 | 12 | 13 | 14 | 15 | 16 | 17 | 18 | 19 | 20 |
|---|---|---|---|---|---|---|---|---|---|---|
| $SiO_2$ | 62.9 | 62.4 | 64.8 | 66.7 | 69.4 | 62.9 | 64.1 | 52.0 | 64.5 | 65.5 |
| $Al_2O_3$ | 5.0 | 5.0 | 5.0 | 3.6 | 1.0 | 5.0 | 5.0 | 9.0 | 6.0 | 5.0 |
| MgO | 8.8 | 9.7 | 6.6 | 12.1 | 6.5 | 10.6 | 9.5 | 14.0 | 11.0 | 12.0 |
| CaO | 4.0 | 4.0 | 4.0 | 1.1 | 4.0 | 4.0 | 4.0 | 0 | 0 | 0 |
| SrO | 0 | 0 | 0 | 0.6 | 0 | 0 | 0 | 0 | 0 | 0 |
| $Na_2O$ | 8.4 | 7.4 | 9.4 | 11.0 | 9.2 | 7.4 | 9.2 | 10.0 | 12.0 | 10.0 |
| $K_2O$ | 9.6 | 10.2 | 8.9 | 4.2 | 8.7 | 8.9 | 6.9 | 14.0 | 4.0 | 5.0 |
| $ZrO_2$ | 1.3 | 1.3 | 1.3 | 0.7 | 1.3 | 1.3 | 1.3 | 1.0 | 2.5 | 2.5 |
| RO | 12.8 | 13.7 | 10.6 | 13.7 | 10.5 | 14.6 | 13.5 | 14.0 | 11.0 | 12.0 |
| $R_2O$ | 17.9 | 17.6 | 18.3 | 15.3 | 17.9 | 16.3 | 16.1 | 24.0 | 16.0 | 15.0 |
| $R_2O$—Al | 12.9 | 12.6 | 13.3 | 11.6 | 16.9 | 11.3 | 11.1 | 15.0 | 10.0 | 10.0 |
| Na + 1.7K | 24.7 | 24.7 | 24.5 | 18.1 | 24.0 | 22.5 | 20.9 | 33.8 | 18.8 | 18.5 |
| S | 526 | 486 | 526 | 743 | 391 | 529 | 648 | 568 | 1023 | 890 |
| t | 60 | 57 | 60 | 48 | 56 | 47 | 48 | 88 | 46 | 48 |
| Tg | 592 | 582 | 580 | 555 | 546 | 605 | 592 | 597 | 620 | 632 |
| $T_2$ | 1520 | 1540 | 1560 | 1512 | 1520 | 1520 | 1520 | 1471 | 1575 | 1589 |
| $T_4$ | 1112 | 1114 | 1126 | 1088 | 1083 | 1113 | 1104 | 1089 | 1168 | 1177 |
| D | — | — | — | — | ○ | ○ | ○ | — | ○ | ○ |
| ρ | 2.53 | 2.51 | 2.50 | 2.50 | 2.49 | 2.53 | 2.52 | 2.56 | 2.53 | 2.52 |
| α | 105 | 104 | 104 | 93 | 102 | 99 | 97 | 129 | 91 | 87 |
| Δ | — | — | — | — | — | — | — | — | 0.08 | 0.10 |

TABLE 3

| Ex. | 21 | 22 | 23 | 24 | 25 | 26 | 27 | 28 | 29 | 30 |
|---|---|---|---|---|---|---|---|---|---|---|
| $SiO_2$ | 64.5 | 66.5 | 67.0 | 61.0 | 61.0 | 61.0 | 61.0 | 61.0 | 62.0 | 62.0 |
| $Al_2O_3$ | 5.0 | 4.0 | 4.0 | 8.0 | 8.0 | 8.0 | 8.0 | 8.0 | 7.0 | 8.0 |
| MgO | 13.0 | 12.5 | 12.0 | 6.5 | 8.5 | 10.5 | 8.5 | 10.5 | 10.5 | 10.5 |
| CaO | 0 | 0 | 0 | 4.0 | 2.0 | 0 | 2.0 | 0 | 1.0 | 0 |
| SrO | 0 | 0 | 0 | 0 | 0 | 0 | 0 | 0 | 0 | 0 |
| $Na_2O$ | 9.5 | 8.6 | 8.6 | 12.0 | 12.0 | 12.0 | 11.0 | 11.0 | 12.0 | 12.0 |
| $K_2O$ | 5.5 | 5.9 | 5.9 | 6.0 | 6.0 | 6.0 | 7.0 | 7.0 | 5.0 | 6.0 |
| $ZrO_2$ | 2.5 | 2.5 | 2.5 | 2.5 | 2.5 | 2.5 | 2.5 | 2.5 | 2.5 | 1.5 |
| RO | 13.0 | 12.5 | 12.0 | 10.5 | 10.5 | 10.5 | 10.5 | 10.5 | 11.5 | 10.5 |

TABLE 3-continued

| Ex. | 21 | 22 | 23 | 24 | 25 | 26 | 27 | 28 | 29 | 30 |
|---|---|---|---|---|---|---|---|---|---|---|
| $R_2O$ | 15.0 | 14.5 | 14.5 | 18.0 | 18.0 | 18.0 | 18.0 | 18.0 | 17.0 | 18.0 |
| $R_2O$—Al | 10.0 | 10.5 | 10.5 | 10.5 | 10.5 | 10.5 | 10.5 | 10.5 | 10.0 | 10.0 |
| Na + 1.7K | 18.9 | 18.6 | 18.6 | 22.2 | 22.2 | 22.2 | 22.9 | 22.9 | 20.5 | 22.2 |
| S | 860 | 782 | 790 | 937 | 977 | 1001 | 910 | 931 | 953 | 958 |
| t | 45 | 50 | 50 | 46 | 52 | 60 | 55 | 62 | 50 | 61 |
| Tg | 628 | 628 | 627 | 601 | 618 | 628 | 606 | 608 | 611 | 594 |
| $T_2$ | 1566 | 1581 | 1589 | 1555 | 1563 | 1571 | 1573 | 1581 | 1554 | 1584 |
| $T_4$ | 1165 | 1174 | 1179 | 1150 | 1160 | 1170 | 1172 | 1182 | 1152 | 1171 |
| D | x | Δ | Δ | ○ | ○ | x | ○ | x | ○ | ○ |
| ρ | 2.53 | 2.52 | 2.51 | 2.58 | 2.56 | 2.55 | 2.56 | 2.55 | 2.55 | 2.52 |
| α | 89 | 87 | 87 | 99 | 99 | 100 | 101 | 100 | 97 | 100 |
| Δ | 0.09 | 0.10 | 0.10 | 0.00 | 0.02 | 0.03 | 0.02 | 0.04 | 0.02 | 0.03 |

TABLE 4

| Ex. | 31 | 32 | 33 | 34 | 35 | 36 | 37 | 38 | 39 | 40 |
|---|---|---|---|---|---|---|---|---|---|---|
| $SiO_2$ | 63.0 | 62.0 | 63.5 | 62.0 | 64.0 | 70.0 | 65 | 68.0 | 70.0 | 65.2 |
| $Al_2O_3$ | 6.5 | 7.0 | 6.5 | 7.0 | 5.5 | 5.5 | 5 | 6.0 | 1.0 | 6.0 |
| MgO | 11.0 | 12.0 | 11.0 | 11.5 | 12.5 | 7.0 | 12 | 0 | 1.0 | 8.0 |
| CaO | 0.5 | 0 | 0 | 0 | 0 | 0 | 0 | 9.0 | 1.0 | 7.0 |
| SrO | 0 | 0 | 0 | 0 | 0 | 0 | 0 | 0 | 0 | 1.0 |
| $Na_2O$ | 11.0 | 11.0 | 12.0 | 12.0 | 10.5 | 12.5 | 10 | 10.5 | 11.0 | 5.0 |
| $K_2O$ | 5.5 | 6.0 | 4.5 | 5.0 | 5.0 | 3.5 | 5 | 6.0 | 13.0 | 6.5 |
| $ZrO_2$ | 2.5 | 2.0 | 2.5 | 2.5 | 2.5 | 1.5 | 2 | 0.5 | 3.0 | 1.3 |
| $Li_2O$ | 0 | 0 | 0 | 0 | 0 | 0 | 1 | 0 | 0 | 0 |
| RO | 11.5 | 12.0 | 11.0 | 11.5 | 12.5 | 7.0 | 12 | 9.0 | 2.0 | 16.0 |
| $R_2O$ | 16.5 | 17.0 | 16.5 | 17.0 | 15.5 | 16.0 | 15 | 16.5 | 24.0 | 11.5 |
| $R_2O$—Al | 10.0 | 10.0 | 10.0 | 10.0 | 10.0 | 10.5 | 10 | 10.5 | 23.0 | 5.5 |
| Na + 1.7K | 20.4 | 21.2 | 19.7 | 20.5 | 19.0 | 18.5 | 18.5 | 20.7 | 33.1 | 16.1 |
| S | 918 | 905 | 987 | 977 | 895 | 1024 | 811 | 649 | 597 | 409 |
| t | 52 | 57 | 51 | 53 | 49 | 51 | 37 | 33 | 85 | 39 |
| Tg | 616 | 609 | 614 | 612 | 623 | 599 | 582 | 567 | 527 | 645 |
| $T_2$ | 1568 | 1567 | 1568 | 1558 | 1562 | 1642 | 1527 | 1572 | 1560 | 1599 |
| $T_4$ | 1165 | 1164 | 1160 | 1157 | 1160 | 1186 | 1113 | 1118 | 1116 | 1178 |
| D | ○ | x | x | x | x | — | — | — | — | ○ |
| ρ | 2.54 | 2.53 | 2.54 | 2.55 | 2.53 | 2.46 | 2.52 | 2.50 | 2.49 | 2.55 |
| α | 94 | 97 | 94 | 96 | 91 | 89 | 90 | 98 | 119 | 84 |
| Δ | 0.04 | 0.04 | 0.04 | 0.03 | 0.03 | 0.06 | — | — | — | — |

TABLE 5

| Ex. | 41 | 42 | 43 | 44 | 45 | 46 | 47 | 48 | 49 | 50 |
|---|---|---|---|---|---|---|---|---|---|---|
| $SiO_2$ | 66.5 | 66.1 | 64.7 | 63.6 | 62.2 | 63.5 | 71.6 | 70.0 | 70.0 | 63.5 |
| $Al_2O_3$ | 3.6 | 3.6 | 5.0 | 5.0 | 5.0 | 5.0 | 0.9 | 5.5 | 6.5 | 5.3 |
| MgO | 12.0 | 11.9 | 11.0 | 15.9 | 13.2 | 11.9 | 5.9 | 6.0 | 6.0 | 12.2 |
| CaO | 4.4 | 1.1 | 4.0 | 4.0 | 4.0 | 4.0 | 8.5 | 0 | 0 | 0.2 |
| SrO | 0.6 | 0.6 | 0 | 0 | 0 | 0 | 0 | 0 | 0 | 0 |
| $Na_2O$ | 8.0 | 13.8 | 9.1 | 5.4 | 5.4 | 7.4 | 12.9 | 13.5 | 12.5 | 15.6 |
| $K_2O$ | 4.2 | 2.3 | 4.9 | 4.9 | 8.9 | 6.9 | 0.3 | 3.5 | 3.5 | 3.2 |
| $ZrO_2$ | 0.6 | 0.6 | 1.3 | 1.3 | 1.3 | 1.3 | 0 | 1.5 | 1.5 | 0 |
| RO | 17.0 | 13.6 | 15.0 | 19.9 | 17.2 | 15.9 | 14.4 | 6.0 | 6.0 | 12.4 |
| $R_2O$ | 12.2 | 16.1 | 14.0 | 10.3 | 14.3 | 14.3 | 13.2 | 17.0 | 16.0 | 18.8 |
| $R_2O$—Al | 8.6 | 12.5 | 9.0 | 5.3 | 9.3 | 9.3 | 12.4 | 11.5 | 9.5 | 13.5 |
| Na + 1.7K | 15.1 | 17.7 | 17.4 | 13.7 | 20.5 | 19.1 | 13.4 | 19.5 | 18.5 | 21.0 |
| S | 688 | 749 | 737 | 499 | 437 | 620 | 588 | 1035 | 1088 | 880 |
| t | 30 | 39 | 35 | 27 | 43 | 40 | 15 | 53 | 51 | 56 |
| Tg | 602 | 518 | 605 | 652 | 617 | 605 | 540 | 588 | 606 | 558 |
| $T_2$ | 1511 | 1476 | 1520 | 1520 | 1520 | 1520 | 1460 | 1638 | 1666 | 1514 |
| $T_4$ | 1093 | 1052 | 1106 | 1126 | 1125 | 1115 | 1099 | 1177 | 1206 | 1073 |
| D | — | — | x | x | x | x | ○ | — | — | — |
| ρ | 2.52 | 2.51 | 2.52 | 2.53 | 2.54 | 2.53 | 2.49 | 2.46 | 2.45 | 2.48 |
| α | 85 | 95 | 89 | 78 | 93 | 91 | — | 92 | 88 | 105 |
| Δ | — | — | — | — | — | — | — | <0.07 | 0.08 | <0.07 |

TABLE 6

| Ex. | 51 | 52 | 53 | 54 | 55 | 56 | 57 |
|---|---|---|---|---|---|---|---|
| $SiO_2$ | 64.2 | 62.6 | 64.1 | 64.8 | 69.0 | 75.3 | 67.0 |
| $Al_2O_3$ | 5.3 | 8.3 | 8.4 | 5.3 | 4.6 | 3.6 | 6.4 |
| MgO | 12.7 | 6.5 | 4.9 | 12.1 | 6.8 | 6.1 | 6.4 |
| CaO | 0.2 | 4.6 | 1.2 | 0.4 | 0 | 0 | 0 |
| SrO | 0 | 0 | 0 | 0 | 0 | 0 | 0 |
| $Na_2O$ | 15.0 | 12.6 | 13.8 | 11.0 | 16.0 | 11.8 | 9.4 |
| $K_2O$ | 2.5 | 2.8 | 2.4 | 6.3 | 3.5 | 3.2 | 6.2 |
| $ZrO_2$ | 0 | 2.6 | 2.7 | 0 | 0 | 0 | 0.5 |
| $B_2O_3$ | 0 | 0 | 0 | 0 | 0.14 | 0 | 0 |
| ZnO | 0 | 0 | 0 | 0 | 0 | 0 | 3.19 |
| $TiO_2$ | 0 | 0 | 2.5 | 0 | 0 | 0 | 0.81 |
| RO | 12.9 | 11.1 | 8.6 | 12.5 | 6.8 | 6.1 | 6.4 |
| $R_2O$ | 17.6 | 15.3 | 16.3 | 17.4 | 19.5 | 15.1 | 15.6 |
| $R_2O$—Al | 12.3 | 7.1 | 7.9 | 12.0 | 14.9 | 11.5 | 9.3 |
| Na + 1.7K | 19.3 | 17.3 | 18.0 | 21.8 | 21.9 | 17.3 | 20.0 |
| S | 909 | 1059 | 1312 | 729 | 925 | 917 | 888 |
| t | 51 | 28 | 36 | 62 | 61 | 52 | 58 |
| Tg | 567 | 640 | 625 | 593 | 538 | 573 | 589 |
| $T_2$ | 1524 | 1572 | 1603 | 1573 | 1536 | 1679 | 1612 |
| $T_4$ | 1083 | 1152 | 555 | 1133 | 1079 | 1192 | 1157 |
| D | — | — | — | — | — | — | — |
| ρ | 2.48 | 2.57 | 2.48 | 2.46 | 2.43 | 2.39 | 2.51 |
| α | 100 | 91 | 89 | 100 | 103 | 85 | 90 |
| Δ | <0.07 | 0.08 | 0.08 | <0.07 | <0.07 | 0.08 | <0.07 |

TABLE 7

| Ex. | 1 | 2 | 3 | 4 | 5 | 6 | 7 | 8 | 9 | 10 |
|---|---|---|---|---|---|---|---|---|---|---|
| $SiO_2$ | 65.2 | 60.5 | 60.2 | 59.1 | 59.2 | 59.2 | 62.6 | 59.2 | 57.6 | 57.1 |
| $Al_2O_3$ | 6.0 | 9.4 | 9.4 | 8.0 | 7.9 | 7.8 | 4.8 | 9.2 | 7.6 | 7.1 |
| MgO | 7.9 | 5.9 | 4.6 | 6.7 | 5.0 | 1.7 | 4.6 | 6.1 | 3.7 | 3.0 |
| CaO | 1.0 | 0 | 1.7 | 1.8 | 3.5 | 6.9 | 3.5 | 3.5 | 3.4 | 3.4 |
| SrO | 1.0 | 0 | 0 | 0 | 0 | 0 | 0 | 0 | 0 | 0 |
| $Na_2O$ | 8.1 | 8.6 | 8.6 | 9.0 | 9.0 | 9.0 | 9.0 | 9.0 | 9.0 | 9.0 |
| $K_2O$ | 9.5 | 13.1 | 13.0 | 13.0 | 13.0 | 13.0 | 13.0 | 13.0 | 13.0 | 13.0 |
| $ZrO_2$ | 1.3 | 2.5 | 2.5 | 2.5 | 2.5 | 2.4 | 2.5 | 0 | 5.6 | 74 |

TABLE 8

| Ex. | 11 | 12 | 13 | 14 | 15 | 16 | 17 | 18 | 19 | 20 |
|---|---|---|---|---|---|---|---|---|---|---|
| $SiO_2$ | 58.6 | 58.1 | 60.1 | 65.2 | 66.1 | 59.1 | 60.7 | 46.9 | 60.9 | 62.2 |
| $Al_2O_3$ | 7.9 | 7.9 | 7.9 | 6.0 | 1.6 | 8.0 | 8.0 | 13.8 | 9.6 | 8.1 |
| MgO | 5.5 | 6.1 | 4.1 | 7.9 | 4.1 | 6.7 | 6.0 | 8.5 | 7.0 | 7.6 |
| CaO | 3.5 | 3.5 | 3.5 | 1.0 | 3.6 | 3.5 | 3.5 | 0 | 0 | 0 |
| SrO | 0 | 0 | 0 | 1.0 | 0 | 0 | 0 | 0 | 0 | 0 |
| $Na_2O$ | 6.0 | 7.1 | 9.0 | 11.1 | 9.0 | 7.1 | 9.0 | 9.3 | 11.7 | 9.8 |
| $K_2O$ | 14.0 | 14.9 | 13.0 | 6.5 | 13.0 | 13.1 | 10.2 | 19.8 | 5.9 | 7.4 |
| $ZrO_2$ | 2.5 | 2.5 | 2.5 | 1.3 | 2.5 | 2.5 | 2.5 | 1.8 | 4.8 | 4.9 |

TABLE 9

| Ex. | 21 | 22 | 23 | 24 | 25 | 26 | 27 | 28 | 29 | 30 |
|---|---|---|---|---|---|---|---|---|---|---|
| $SiO_2$ | 61.3 | 63.4 | 63.8 | 55.7 | 55.9 | 56.2 | 55.7 | 55.9 | 57.8 | 57.7 |
| $Al_2O_3$ | 8.1 | 6.5 | 6.5 | 12.4 | 12.4 | 12.5 | 12.4 | 12.4 | 11.1 | 12.6 |
| MgO | 8.3 | 8.0 | 7.7 | 4.0 | 5.2 | 6.5 | 5.2 | 6.5 | 6.6 | 6.6 |
| CaO | 0 | 0 | 0 | 3.4 | 1.7 | 0 | 1.7 | 0 | 0.9 | 0 |
| SrO | 0 | 0 | 0 | 0 | 0 | 0 | 0 | 0 | 0 | 0 |
| $Na_2O$ | 9.3 | 8.5 | 8.4 | 11.3 | 11.4 | 11.4 | 10.4 | 10.4 | 11.5 | 11.5 |
| $K_2O$ | 8.2 | 8.8 | 8.8 | 6.6 | 8.6 | 8.7 | 10.0 | 10.1 | 7.3 | 8.8 |
| $ZrO_2$ | 4.9 | 4.9 | 4.9 | 4.7 | 4.7 | 4.7 | 4.7 | 4.7 | 4.8 | 2.9 |

TABLE 10

| Ex. | 31 | 32 | 33 | 34 | 35 | 36 | 37 | 38 | 39 | 40 |
|---|---|---|---|---|---|---|---|---|---|---|
| $SiO_2$ | 58.9 | 58.1 | 59.6 | 58.0 | 60.7 | 66.4 | 62.3 | 63.1 | 63.0 | 60.9 |
| $Al_2O_3$ | 10.3 | 11.1 | 10.4 | 11.1 | 8.8 | 8.8 | 8.1 | 9.4 | 1.5 | 9.5 |
| MgO | 6.9 | 7.5 | 6.9 | 7.2 | 7.9 | 4.5 | 7.7 | 0 | 0.6 | 5.0 |
| CaO | 0.4 | 0 | 0 | 0 | 0 | 0 | 1.7 | 7.8 | 0.8 | 6.1 |
| SrO | 0 | 0 | 0 | 0 | 0 | 0 | 0 | 0 | 0 | 1.6 |
| $Na_2O$ | 10.6 | 10.6 | 11.6 | 11.6 | 10.3 | 12.2 | 9.9 | 10.0 | 10.2 | 4.8 |
| $K_2O$ | 8.1 | 8.8 | 6.6 | 7.3 | 7.4 | 5.2 | 7.5 | 8.7 | 18.3 | 9.5 |
| $ZrO_2$ | 4.8 | 3.8 | 4.8 | 4.8 | 4.9 | 2.9 | 3.9 | 1.0 | 5.5 | 2.5 |
| $Li_2O$ | 0 | 0 | 0 | 0 | 0 | 0 | 0.5 | 0 | 0 | 0 |

TABLE 11

| Ex. | 41 | 42 | 43 | 44 | 45 | 46 | 47 | 48 | 49 | 50 |
|---|---|---|---|---|---|---|---|---|---|---|
| $SiO_2$ | 65.2 | 65.2 | 62.2 | 62.1 | 59.0 | 60.6 | 72.5 | 66.1 | 65.7 | 62.3 |
| $Al_2O_3$ | 6.0 | 6.0 | 8.2 | 8.3 | 8.0 | 8.1 | 1.5 | 8.8 | 10.4 | 8.8 |
| MgO | 7.9 | 7.9 | 7.1 | 10.4 | 8.4 | 7.6 | 4.0 | 3.8 | 3.8 | 7.8 |
| CaO | 4.0 | 1.0 | 3.6 | 3.6 | 3.5 | 3.6 | 8.0 | 0 | 0 | 0.2 |
| SrO | 1.0 | 1.0 | 0 | 0 | 0 | 0 | 0 | 0 | 0 | 0 |
| $Na_2O$ | 8.1 | 14.1 | 9.0 | 5.4 | 5.2 | 7.2 | 13.5 | 13.2 | 12.1 | 15.8 |
| $K_2O$ | 6.5 | 3.5 | 7.4 | 7.5 | 13.2 | 10.3 | 0.5 | 5.2 | 5.2 | 4.9 |
| $ZrO_2$ | 1.3 | 1.3 | 2.6 | 2.6 | 2.5 | 2.5 | 0 | 2.9 | 2.9 | 0 |

TABLE 12

| Ex. | 51 | 52 | 53 | 54 | 55 | 56 | 57 |
|---|---|---|---|---|---|---|---|
| $SiO_2$ | 63.4 | 57.9 | 58.4 | 62.0 | 66.1 | 74 | 62 |
| $Al_2O_3$ | 8.8 | 13.0 | 13.0 | 8.7 | 7.5 | 5 | 10 |
| MgO | 8.2 | 4.0 | 3.0 | 7.7 | 4.4 | 4 | 4 |
| CaO | 0.2 | 4.0 | 1.0 | 0.4 | 0 | 0 | 0 |
| SrO | 0 | 0 | 0 | 0 | 0 | 0 | 0 |
| $Na_2O$ | 15.3 | 12.0 | 13.0 | 10.9 | 15.9 | 12 | 9 |
| $K_2O$ | 3.9 | 4.0 | 3.5 | 9.5 | 5.2 | 5 | 9 |
| $ZrO_2$ | 0 | 5.0 | 5.0 | 0 | 0 | 0 | 1 |
| $B_2O_3$ | 0 | 0 | 0 | 0 | 0.15 | 0 | 0 |
| ZnO | 0 | 0 | 0 | 0 | 0 | 0 | 4 |
| $TiO_2$ | 0 | 0 | 3.0 | 0 | 0 | 0 | 1 |

Material Examples 58 to 83

Glasses in Material Examples 58 to 75 and 83, are ones which satisfy the composition of the above glass C, and glasses in Material Examples 76 to 82 are Comparative Examples to the above glass C and ones which depart from the composition of the above glass C.

With respect to Material Examples 58 to 73, 76 to 79, 81, 82 and 83, commonly-employed glass raw materials such as oxides, hydroxides, carbonates, nitrates, etc. were suitably selected to bring the compositions as shown by mol percentage in rows for from $SiO_2$ to $K_2O$ in Tables 13 to 15 and 19, and they were weighed to be 400 g as glass. To the weighed materials, sodium sulfate corresponding to 0.2% of their mass was added, followed by mixing. Then, the mixed raw materials were put into a platinum crucible, which was introduced into a resistance heating electric furnace at 1,650° C., and melted, defoamed and homogenized for 5 hours. The obtained molten glass was cast into a mold, then held for one hour at a temperature of Tg+50° C., followed by cooling to room temperature at a rate of 0.5° C./min to obtain a glass block. This glass block was cut and ground, and finally both surfaces were mirror polished to obtain a plate glass having a size of 30 mm×30 mm and a thickness of 1.0 mm.

Further, Material Example 80 in Table 15 is an example of separately prepared soda lime glass, and in Material Examples 74 and 75 in Table 14, melting, etc. of glass as described above were not carried out.

For the purpose of reference, the compositions represented by mass percentage of glasses in Material Examples 58 to 83 are shown in Tables 16 to 18 and 20.

The glass transition point Tg (unit: ° C.), the temperature $T_2$ (unit: ° C.) at which the viscosity became $10^2$ dPa·s, the temperature $T_4$ (unit: ° C.) at which the viscosity became $10^4$ dPa·s, the specific gravity ρ, and the average thermal expansion coefficient α (unit: $×10^{-7}$/° C.) at from 50 to 350° C., the Young's modulus E (unit: GPa), the Poisson's ratio σ, and cracking rate $P_0$ (unit: %) at the time of no tempering, of each of these glasses, are shown in Tables. Further, data identified with "*" in Tables are ones obtained by calculation or estimation from the compositions.

$P_0$ is a cracking rate when a load of 500 gf (4.9 N) was exerted by means of a vicker's hardness meter, and it was measured as follows.

A plate glass was ground to a thickness of from 300 to 1,000 μm by using a grinding stone of #1000 (1000 grit), and then, its surfaces were mirror-polished by means of cerium oxide. Then, in order to remove the processing strain on the mirror-polished surfaces, the plate glass was heated to a temperature of Tg+50° C. under atmospheric pressure in a resistance heating electric furnace and held at that temperature for one hour, and then, cooled to room temperature at a rate of 0.5° C./min. Here, the heating was carried out at such a raising rate that it took one hour until the temperature reached Tg.

Using the sample treated as described above, the cracking rate was measured. That is, under atmospheric pressure and under conditions of a temperature of from 20 to 28° C. and a dew point of −30° C., by adjusting the load of the vicker's hardness meter to be 500 gf (4.9 N), a vicker's indenter was pushed into the sample at ten points, whereupon the number of cracks formed at four corners of the indentation was measured. The number of formed cracks was divided by 40 as the possible number of cracks to be formed and represented by percentage, which was taken as the cracking rate $P_0$ (unit: %).

The lower the cracking rate $P_0$ of non-tempered glass, the better. None of glasses in Material Examples 58 to 75 and 83 has $P_0$ exceeding 50%, thus indicating that even in a non-tempered state, cracking is less likely to occur.

Then, with respect to plate glasses in Material Examples 58 to 73, 76 to 82 and 83, the following chemical tempering treatment was carried out. That is, each of these glasses was immersed for 8 hours in a molten salt of $KNO_3$ at 400° C. to carry out chemical tempering treatment. Here, the $KNO_3$ content in the molten salt of $KNO_3$ was from 99.7 to 100%, and the $NaNO_3$ content was from 0 to 0.3%.

With respect to each glass after the chemical tempering treatment, the surface compression stress S (unit: MPa) and the depth t (unit: μm) of the compression stress layer were measured by a surface stress meter FSM-6000, manufactured by Orihara Manufacturing Co., LTD. The results are shown in the corresponding rows in Tables.

Further, with respect to 20 plate glasses after the chemical tempering treatment in each of Material Examples 58, 65 and 80 to 83, under atmospheric pressure and under conditions of a temperature of from 20 to 28° C. and a humidity of from 40 to 60%, a vicker's indenter of a vicker's hardness meter was pushed into them with a load of 5 kgf (49 N), whereupon the number of plate glasses fractured from the indentation was divided by 20 as the total number of measured plate glasses and represented by percentage, which was taken as the fracture rate $P_1$ (unit: %).

In Material Examples 58, 65 and 83, no glass was fractured, and $P_1$ was 0%. Whereas, with glasses in Material Examples 80 to 82, $P_1$ was 100%, i.e. all of them fractured. That is, glass C has a low risk for fracture even if an indentation is formed.

Further, with respect to glasses in Material Examples 58, 65 and 80 to 82, glasses were separately prepared, each of which had a shape of 4 mm×10 mm×1 mm in thickness and had one surface of 4 mm×10 mm mirror-finished and the other surface #1000 finished. These glasses were subjected to chemical tempering treatment at from 425 to 450° C. by using a molten salt of potassium nitrate ($KNO_3$: 98 to 99.8%, $NaNO_3$: 0.2 to 2%). The surface compression stress S and the depth t of the compression stress layer were, respectively, 757 MPa and 55 μm in Material Example 58, 878 MPa and 52 μm in Material Example 65, 607 MPa and 15 μm in Material Example 80, 790 MPa and 49 μm in Material Example 81, and 830 MPa and 59 μm in Material Example 82.

At the center of the surface of 4 mm×10 mm of each of these glasses after the chemical tempering treatment, a vicker's indenter was pushed in with a load of 10 kgf (98 N) by means of a vicker's hardness meter to form an indentation. Glasses in Material Examples 80 to 82 fractured at the time of forming the indentation, but glasses in Material Examples 58, 65 and 83 did not fracture.

A three point bending test was carried out with a spun of 30 mm by using samples in Material Examples 58, 65 and 83 having such an indentation formed with a load of 10 kgf (98 N). The bending strength average value (unit: MPa) with n=20 is shown in the row for F in each of Tables 13 and 19. Those obtained by chemically tempering glasses in Material Examples 58, 65 and 83 showed a very high fracture stress at a level of at least 400 MPa even in a state having an indentation formed.

TABLE 13

| Ex. | 58 | 59 | 60 | 61 | 62 | 63 | 64 | 65 | 66 |
|---|---|---|---|---|---|---|---|---|---|
| $SiO_2$ | 73.0 | 75.5 | 73.0 | 73.0 | 73.0 | 73.0 | 73.2 | 72.0 | 72.0 |
| $Al_2O_3$ | 7.0 | 4.9 | 5.0 | 5.0 | 7.0 | 7.0 | 7.0 | 6.0 | 7.0 |
| MgO | 6.0 | 5.9 | 8.0 | 10.0 | 5.5 | 5.5 | 5.5 | 10.0 | 10.0 |
| CaO | 0 | 0 | 0 | 0 | 0 | 0 | 0 | 0 | 0 |
| $ZrO_2$ | 0 | 0 | 0 | 0 | 0.5 | 0.5 | 0.3 | 0 | 0 |
| $Na_2O$ | 14.0 | 13.7 | 14.0 | 12.0 | 14.0 | 14.0 | 14.0 | 12.0 | 11.0 |
| $K_2O$ | 0 | 0 | 0 | 0 | 0 | 0 | 0 | 0 | 0 |
| Tg | 617 | 586 | 600 | 632 | 625 | 617 | 620 | 647 | 674 |
| $T_2$ | 1734 | 1680* | 1642* | 1652* | 1696* | 1721* | 1710* | 1711 | 1687* |
| $T_4$ | 1256 | 1195* | 1170* | 1187* | 1214* | 1206* | 1203* | 1256 | 1225* |
| ρ | 2.405 | 2.392 | 2.408 | 2.410 | 2417 | 2.409 | 2.424 | 2.412 | 2.409 |
| α | 79 | 78 | 80 | 72 | 77.25 | 77.26 | 77.74 | 71.71 | 68 |
| E | 70.8 | 69.7 | 70.6 | 72.9 | 73 | 72.3 | 74.6 | 73.1 | 72.8 |
| σ | 0.204 | 0.203 | 0.207 | 0.207 | 0.226 | 0.23 | 0.218 | 0.207 | 0.226 |
| $P_0$ | 10 | 10 | 0 | 0 | 10 | 0 | 5 | 0 | 7.5 |
| S | 909 | 699 | 821 | 918 | 931 | 864 | 878 | 943 | 915 |
| t | 33 | 34 | 30 | 23 | 33 | 35 | 33 | 24 | 23 |
| $P_1$ | 0 | 0* | 0* | 0* | 0* | 0* | 0* | 0 | 0* |
| F | 495 | 445* | 505* | 552* | 559* | 526* | 533* | 565 | 550* |

TABLE 14

| Ex. | 67 | 68 | 69 | 70 | 71 | 72 | 73 | 74 | 75 |
|---|---|---|---|---|---|---|---|---|---|
| $SiO_2$ | 72.0 | 72.0 | 72.0 | 71.7 | 71.4 | 70.0 | 70.1 | 73.0 | 77.9 |
| $Al_2O_3$ | 7.0 | 6.0 | 6.0 | 7.1 | 8.2 | 9.0 | 6.0 | 9.0 | 4.8 |
| MgO | 9.0 | 12.0 | 14.0 | 8.1 | 6.1 | 7.0 | 10.3 | 6.0 | 5.8 |
| CaO | 0 | 0 | 0 | 0 | 0 | 0 | 0 | 0 | 0 |
| $ZrO_2$ | 0 | 0 | 0 | 0 | 0 | 0 | 0.63 | 0 | 0 |
| $Na_2O$ | 12.0 | 10.0 | 8.0 | 13.1 | 14.3 | 14.0 | 12.0 | 12.0 | 11.5 |
| $K_2O$ | 0 | 0 | 0 | 0 | 0 | 0 | 1.0 | 0 | 0 |
| Tg | 660 | 678 | 701 | 635* | 629* | 640* | 634* | 612* | 628* |
| $T_2$ | 1682* | 1669* | 1679* | 1674* | 1689* | 1687* | 1638* | 1744* | 1727* |

TABLE 14-continued

| Ex. | 67 | 68 | 69 | 70 | 71 | 72 | 73 | 74 | 75 |
|---|---|---|---|---|---|---|---|---|---|
| $T_4$ | 1216* | 1214* | 1231* | 1205* | 1214* | 1219* | 1187* | 1271* | 1236* |
| ρ | 2.410 | 2.415 | 2.419 | 2.41* | 2.41* | 2.42* | 2.44* | 2.40* | 2.37* |
| α | 72 | 65 | 57 | 78* | 81* | 81* | 79* | 72* | 70* |
| E | 72.3 | 74.3 | 73.3 | 73* | 73* | 74* | 74* | 71* | 69* |
| σ | 0.23 | 0.218 | 0.207 | 0.20* | 0.20* | 0.20* | 0.20* | 0.20* | 0.20* |
| $P_0$ | 15 | 10 | 15 | 22.5 | 32.5 | 35 | 25 | 0* | 0* |
| S | 974 | 853 | 667 | 983 | 970 | 1101 | 928 | 1069* | 749* |
| t | 25 | 18 | 15 | 31 | 36 | 33 | 27 | 17* | 27* |
| $P_1$ | 0* | 0* | 0* | 0* | 0* | 0* | 0* | 0* | 0* |
| F | 579* | 520* | 430* | 584* | 578* | 641* | 557* | 626* | 470* |

TABLE 15

| Ex. | 76 | 77 | 78 | 79 | 80 | 81 | 82 |
|---|---|---|---|---|---|---|---|
| $SiO_2$ | 71.1 | 68.3 | 66.4 | 66.0 | 72.0 | 64.5 | 66.6 |
| $Al_2O_3$ | 9.3 | 6.0 | 6.0 | 7.0 | 1.1 | 6.0 | 10.8 |
| MgO | 4.1 | 10.5 | 10.8 | 11.0 | 5.5 | 11.0 | 6.2 |
| CaO | 0 | 0 | 0 | 0 | 8.6 | 0 | 0.6 |
| $ZrO_2$ | 0 | 1.3 | 1.9 | 0 | 0 | 2.5 | 0 |
| $Na_2O$ | 15.5 | 12.0 | 12.0 | 12.0 | 12.6 | 12.0 | 13.2 |
| $K_2O$ | 0 | 2.0 | 3.0 | 4.0 | 0.2 | 4.0 | 2.4 |
| Tg | 623* | 629* | 623* | 596* | 540 | 620 | 590 |
| $T_2$ | 1704* | 1614* | 1592* | 1609* | 1461 | 1575 | 1686* |
| $T_4$ | 1223* | 1178* | 1168* | 1170* | 1039 | 1168 | 1240* |
| ρ | 2.41* | 2.47* | 2.50* | 2.46* | 2.49 | 2.53 | 2.46 |
| α | 84* | 83* | 87* | 93* | 87 | 91 | 93 |
| E | 73* | 74* | 75* | 74* | 73 | 78 | 73* |
| σ | 0.20* | 0.20* | 0.20* | 0.20* | 0.20* | 0.22 | 0.21* |
| $P_0$ | 70 | 60 | 82.5 | 82.5 | 90 | 82.5 | 60 |
| S | 943 | 974 | 894 | 831 | 713 | 987 | 843 |
| t | 40 | 29 | 27 | 37 | 10 | 34 | 37 |
| $P_1$ | 100* | 100* | 100* | 100* | 100 | 100 | 100 |
| F | — | — | — | — | — | — | — |

TABLE 16

| Ex. | 58 | 59 | 60 | 61 | 62 | 63 | 64 | 65 | 66 |
|---|---|---|---|---|---|---|---|---|---|
| $SiO_2$ | 70.6 | 74.1 | 72.1 | 72.6 | 70.2 | 70.4 | 69.9 | 71.1 | 70.6 |
| $Al_2O_3$ | 11.5 | 8.2 | 8.4 | 8.4 | 11.4 | 11.5 | 11.4 | 10.1 | 11.7 |
| MgO | 3.9 | 3.9 | 5.3 | 6.7 | 3.5 | 3.6 | 3.5 | 6.6 | 6.6 |
| CaO | 0 | 0 | 0 | 0 | 0 | 0 | 0 | 0 | 0 |
| $ZrO_2$ | 0 | 0 | 0 | 0 | 1.0 | 0.6 | 1.3 | 0 | 0 |
| $Na_2O$ | 14.0 | 13.9 | 14.3 | 12.3 | 13.9 | 13.9 | 13.8 | 12.2 | 11.1 |
| $K_2O$ | 0 | 0 | 0 | 0 | 0 | 0 | 0 | 0 | 0 |

TABLE 17

| Ex. | 67 | 68 | 69 | 70 | 71 | 72 | 73 | 74 | 75 |
|---|---|---|---|---|---|---|---|---|---|
| $SiO_2$ | 70.4 | 71.6 | 72.1 | 69.8 | 68.6 | 67.0 | 68.5 | 69.7 | 76.5 |
| $Al_2O_3$ | 11.6 | 10.1 | 10.2 | 11.7 | 13.3 | 14.6 | 9.9 | 14.6 | 8.0 |
| MgO | 5.9 | 8.0 | 9.4 | 5.3 | 3.9 | 4.5 | 6.7 | 3.8 | 3.8 |
| CaO | 0 | 0 | 0 | 0 | 0 | 0 | 0 | 0 | 0 |
| $ZrO_2$ | 0 | 0 | 0 | 0 | 0 | 0 | 1.3 | 0 | 0 |
| $Na_2O$ | 12.1 | 10.3 | 8.3 | 13.2 | 14.2 | 13.8 | 12.1 | 11.8 | 11.7 |
| $K_2O$ | 0 | 0 | 0 | 0 | 0 | 0 | 1.5 | 0 | 0 |

TABLE 18

| Ex. | 76 | 77 | 78 | 79 | 80 | 81 | 82 |
|---|---|---|---|---|---|---|---|
| $SiO_2$ | 67.4 | 65.9 | 63.4 | 63.5 | 72.8 | 61.9 | 60.9 |
| $Al_2O_3$ | 14.9 | 9.8 | 9.7 | 11.4 | 1.9 | 17.1 | 9.6 |
| MgO | 2.6 | 6.8 | 6.9 | 7.1 | 3.7 | 3.9 | 7.0 |
| CaO | 0 | 0 | 0 | 0 | 8.1 | 0.6 | 0.0 |

TABLE 18-continued

| Ex. | 76 | 77 | 78 | 79 | 80 | 81 | 82 |
|---|---|---|---|---|---|---|---|
| $ZrO_2$ | 0 | 2.5 | 3.7 | 0 | 0 | 0 | 4.8 |
| $Na_2O$ | 15.1 | 12.0 | 11.8 | 11.9 | 13.1 | 12.7 | 11.7 |
| $K_2O$ | 0 | 3.0 | 4.5 | 6.0 | 0.3 | 3.5 | 5.9 |

TABLE 19

| Ex. | 83 | 84 |
|---|---|---|
| $SiO_2$ | 72.4 | 64.3 |
| $Al_2O_3$ | 6.3 | 8.0 |
| MgO | 8.5 | 10.5 |
| CaO | 0 | 0.1 |
| $ZrO_2$ | 0 | 0.5 |
| SrO | 0 | 0.1 |
| BaO | 0 | 0.1 |
| $Na_2O$ | 12.8 | 12.5 |
| $K_2O$ | 0 | 4.0 |
| Tg | 627 | 607 |
| $T_2$ | 1741 | 1607 |
| $T_4$ | 1267 | 1184 |
| ρ | 2.41 | 2.48 |
| α | 74 | 98 |
| E | 70 | 74 |
| σ | 0.22 | 0.2 |
| $P_0$ | 0 | 50 |
| S | 892 | 960 |
| t | 24 | 33 |
| $P_1$ | 0 | 100 |
| F | 540* | — |

TABLE 20

| Ex. | 83 | 84 |
|---|---|---|
| $SiO_2$ | 71.1 | 60.9 |
| $Al_2O_3$ | 10.3 | 12.8 |
| MgO | 5.6 | 6.7 |
| CaO | 0 | 0.1 |
| SrO | 0 | 0.2 |
| BaO | 0 | 0.2 |
| $ZrO_2$ | 0 | 1.0 |
| $Na_2O$ | 13.0 | 10.8 |
| $K_2O$ | 0 | 5.9 |

Example 1

In Example 1, a plasma display device 10 shown in FIG. 1 is produced. In Example 1, a function membrane 40 is not formed on a cover glass plate 30.
(Plasma Display Panel)
Two aluminosilicate glass substrates are prepared as glass substrates for a plasma display panel. These glass substrates are ones comprising, as represented by mol percentage based on oxides, 67% of $SiO_2$, 5% of $Al_2O_3$, 4.5% of $Na_2O$, 4.5% of $K_2O$, 3.5% of MgO, 6.0% of CaO, 4.5% of SrO, 3.5% of BaO and 1.5% of $ZrO_2$. The average thermal expansion coefficient within a range of from 50 to 350° C., of these glass substrates, is $83 \times 10^{-7}$/° C.

On one aluminosilicate glass substrate, a transparent electrode is formed in a predetermined pattern to prepare a front substrate. Further, on the other aluminosilicate glass substrate, a transparent electrode, a partition wall and a phosphor layer are formed in a predetermined order to prepare a rear substrate. Then, the front substrate and the rear substrate were bonded to each other, and a rare gas is sealed in between them to prepare a plasma display panel. The diagonal length on the display side of the plasma display panel is 37 inches (about 94 cm).
(Cover Glass Plate)
As a cover glass plate, an aluminosilicate glass plate (thickness: 1.5 mm, diagonal length: 40 inches (102 cm)) having the same composition as the glass substrates for the plasma display panel, is prepared. The average thermal expansion coefficient of this cover glass plate is substantially the same as the average thermal expansion coefficient of the glass substrates for the plasma display panel.
(Plasma Display Device)
Using an adhesive, the above cover glass plate is bonded to the display side of the above plasma display panel. As the adhesive, a thermosetting adhesive is used. In such a manner, a plasma display device is prepared.

During the display operation of this plasma display device, the flatness of the cover glass plate is measured. As a result of the measurement, the cover glass plate is found to have a sufficiently small difference in thermal expansion from the glass substrates for the plasma display panel and a good flatness (at most 1.0 mm) (JIS B0021).

Example 2

In Example 2, a plasma display device is produced in the same manner as in Example 1 except that the following chemically tempered glass plate is used as the cover glass plate.
The chemically tempered glass plate in Example 2 is one obtained by chemically tempering a glass plate having the same composition as in Material Example 19 shown in Table 2, for six hours in a 100 mass % sodium nitrate molten liquid held at 450° C. The average thermal expansion coefficient within a range of from 50 to 350° C., of this chemically tempered glass plate, is $91 \times 10^{-7}$/° C., which is 110% of the average thermal expansion coefficient of the glass substrates for the plasma display panel.

During the display operation of this plasma display device, the flatness of the cover glass plate is measured. As a result of the measurement, the cover glass plate is found to have a sufficiently small difference in thermal expansion from the glass substrates for the plasma display panel and a good flatness (at most 1.0 mm).

Example 3

In Example 3, a plasma display device is produced in the same manner as in Example 1 except that the following chemically tempered glass plate is used as the cover glass plate.
The chemically tempered glass plate in Example 3 is one obtained by chemically tempering a glass plate having the same composition as in Material Example 65 shown in Table 13, for 10 hours in a 100 mass % potassium nitrate molten liquid held at 450° C. The average thermal expansion coefficient within a range of from 50 to 350° C., of this chemically tempered glass plate, is $72 \times 10^{-7}$/° C., which is 87% of the average thermal expansion coefficient of the glass substrates for the plasma display panel.

During the display operation of this plasma display device, the flatness of the cover glass plate is measured. As a result of the measurement, the cover glass plate is found to have a sufficiently small difference in thermal expansion from the glass substrates for the plasma display panel and a good flatness (at most 1.0 mm).

Comparative Example 1

In Comparative Example 1, a plasma display device is produced in the same manner as in Example 1 except that an alkali-free glass plate is used as the cover glass plate.
The average thermal expansion coefficient within a range of from 50 to 350° C., of this chemically tempered glass in Comparative Example 1 is $38 \times 10^{-7}$/° C., which is 46% of the average thermal expansion coefficient of the glass substrates constituting the plasma display panel.

During the display operation of this plasma display device, the flatness of the cover glass plate is measured. As a result of the measurement, the difference in thermal expansion between the cover glass plate and the glass substrates for the plasma display panel, is large, and a good flatness is not obtainable.

From the results of Examples and Comparative Example, it is expected that among flatness disclosed in Tables 1 to 20, a good planarity is obtainable with those, of which the average thermal expansion coefficient is from 80 to 120% of the average thermal expansion coefficient of the glass substrates for the plasma display panel.
Industrial Applicability
According to the present invention, the difference in the average thermal expansion coefficient between the glass substrate on the display side of a plasma display panel and the cover glass plate bonded to the display side of the plasma display panel is controlled to be within a predetermined range, whereby it is possible to prevent warpage of the cover glass plate, to avoid impairment of the display of the plasma display device and to obtain a good flatness on the cover glass plate side. Such a construction is particularly useful for a plasma display device with a large screen wherein a thin cover glass plate having a large area is used.

| REFERENCE SYMBOLS | |
|---|---|
| 10: | Plasma display device |
| 20: | Plasma display panel |
| 21: | Glass substrate |
| 22: | Glass substrate |
| 23: | Phosphor layer |
| 30: | Cover glass plate |
| 40: | Function membrane |
| 50: | Decorative layer |

What is claimed is:

1. A plasma display device comprising:
a plasma display panel provided with glass substrates; and
a cover glass plate bonded to the display side of the plasma display panel, wherein the cover glass plate has a diagonal length of at least 81 cm and a thickness of at most 1.5 mm, the average thermal expansion coefficient of the cover glass plate is from 80 to 120% of the average thermal expansion coefficient of the glass substrates within a range of from 50 to 350° C., and the cover glass plate is a chemically tempered glass plate having a compression stress layer formed at least at a part of the surface layer by chemical tempering treatment.

2. The plasma display device according to claim 1, wherein the cover glass plate before the chemical tempering treatment contains, as represented by mol percentage based on oxides, from 55 to 70% of $SiO_2$, from 5 to 15% of $Al_2O_3$, from 4 to 20% of $Na_2O$ and from 1 to 15% of MgO, and the total amount of these components is at least 85%.

3. The plasma display device according to claim 1, wherein the cover glass plate before the chemical tempering treatment contains, as represented by mol percentage based on oxides, from 50 to 74% of $SiO_2$, from 1 to 10% of $Al_2O_3$, from 6 to 14% of $Na_2O$, from 3 to 15% of $K_2O$, from 2 to 15% of MgO, from 0 to 10% of CaO and from 0 to 5% of $ZrO_2$, and the total of contents of $SiO_2$ and $Al_2O_3$ is at most 75%, the total of contents of $Na_2O$ and $K_2O$ i.e. $Na_2O+K_2O$ is from 12 to 25% and the total of contents of MgO and CaO i.e. MgO+CaO is from 7 to 15%.

4. The plasma display device according to claim 1, wherein the cover glass plate before the chemical tempering treatment contains, as represented by mol percentage based on oxides, from 68 to 80% of $SiO_2$, from 4 to 10% of $Al_2O_3$, from 5 to 15% of $Na_2O$, from 0 to 1% of $K_2O$, from 4 to 15% of MgO and from 0 to 1% of $ZrO_2$, and the total of contents of $SiO_2$ and $Al_2O_3$ i.e. $SiO_2+Al_2O_3$ is at most 85%.

5. The plasma display device according to claim 1, wherein the average thermal expansion coefficient of the cover glass plate is from 85 to 115% of the average thermal expansion coefficient of the glass substrates within a range of from 50 to 350° C.

6. The plasma display device according to claim 1, wherein the average thermal expansion coefficient of the cover glass plate is from 90 to 110% of the average thermal expansion coefficient of the glass substrates within a range of from 50 to 350° C.

* * * * *